United States Patent
Matsuda et al.

(10) Patent No.: US 12,371,772 B2
(45) Date of Patent: Jul. 29, 2025

(54) ALLOYED HOT DIP GALVANNEALED STEEL SHEET

(71) Applicant: NIPPON STEEL CORPORATION, Tokyo (JP)

(72) Inventors: Keitaro Matsuda, Tokyo (JP); Takuya Mitsunobu, Tokyo (JP); Masaaki Uranaka, Tokyo (JP); Jun Maki, Tokyo (JP); Hiroshi Takebayashi, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 0 days.

(21) Appl. No.: 18/272,712

(22) PCT Filed: Mar. 14, 2022

(86) PCT No.: PCT/JP2022/011417
§ 371 (c)(1),
(2) Date: Jul. 17, 2023

(87) PCT Pub. No.: WO2022/230402
PCT Pub. Date: Nov. 3, 2022

(65) Prior Publication Data
US 2024/0141469 A1    May 2, 2024

(30) Foreign Application Priority Data
Apr. 27, 2021  (JP) .................................. 2021-075276

(51) Int. Cl.
*C23C 2/06* (2006.01)
*C21D 6/00* (2006.01)
(Continued)

(52) U.S. Cl.
CPC ................ *C23C 2/06* (2013.01); *C21D 6/001* (2013.01); *C21D 6/002* (2013.01); *C21D 6/005* (2013.01);
(Continued)

(58) Field of Classification Search
None
See application file for complete search history.

(56) References Cited

U.S. PATENT DOCUMENTS

| 2010/0304183 | A1 | 12/2010 | Honda et al. |
| 2016/0160335 | A1 | 6/2016 | Ikeda |

(Continued)

FOREIGN PATENT DOCUMENTS

| EP | 2 944 705 B1 | 3/2019 |
| JP | 4741376 B2 | 8/2011 |

(Continued)

*Primary Examiner* — Daniel J. Schleis
(74) *Attorney, Agent, or Firm* — Birch, Stewart, Kolasch & Birch, LLP

(57) ABSTRACT

High strength plated steel sheet having high hydrogen embrittlement resistance, that is, alloyed hot dip galvannealed steel sheet including steel sheet containing C: 0.05 to 0.40%, Si: 0.2 to 3.0%, Mn: 0.1 to 5.0%, and sol. Al: 0.4 to 1.50% and a alloyed hot dip galvannealed layer deposited on at least one surface of the steel sheet to 10 to 100 g/m² and containing Fe: 5.0 to 15.0% and Al: 0.01 to 1.0%, having an internal oxidation layer including grain boundary oxides in a surface layer of the steel sheet, when examining a cross-section of a surface layer of the steel sheet, a Ratio A of the length of the grain boundary oxides projected an interface of the steel sheet and the alloyed hot dip galvannealed layer to the length of interface is 50% or more and 100% or less, and a surface depleted layer with a steel composition not including the grain boundary oxides which satisfies, by mass %, Si≤0.6% and Al≥0.05% is included at (Continued)

a depth of ½ of the average depth of the internal oxidation layer.

4 Claims, 2 Drawing Sheets

(51) Int. Cl.
    *C21D 8/02*     (2006.01)
    *C21D 9/46*     (2006.01)
    *C22C 38/00*     (2006.01)
    *C22C 38/02*     (2006.01)
    *C22C 38/04*     (2006.01)
    *C22C 38/06*     (2006.01)
    *C22C 38/08*     (2006.01)
    *C22C 38/12*     (2006.01)
    *C22C 38/14*     (2006.01)
    *C22C 38/16*     (2006.01)
    *C22C 38/38*     (2006.01)
    *C23C 2/02*     (2006.01)
    *C23C 2/16*     (2006.01)
    *C23C 2/28*     (2006.01)
(52) U.S. Cl.
    CPC ........... *C21D 6/008* (2013.01); *C21D 8/0205* (2013.01); *C21D 8/0236* (2013.01); *C21D 8/0252* (2013.01); *C21D 8/0278* (2013.01); *C21D 9/46* (2013.01); *C22C 38/001* (2013.01); *C22C 38/002* (2013.01); *C22C 38/005* (2013.01); *C22C 38/02* (2013.01); *C22C 38/04* (2013.01); *C22C 38/06* (2013.01); *C22C 38/08* (2013.01); *C22C 38/12* (2013.01); *C22C 38/14* (2013.01); *C22C 38/16* (2013.01); *C22C 38/38* (2013.01); *C23C 2/022* (2022.08); *C23C 2/16* (2013.01); *C23C 2/285* (2013.01)

(56) References Cited

U.S. PATENT DOCUMENTS

2018/0002799 A1     1/2018   Futamura et al.
2020/0325554 A1   10/2020   Takeda et al.

FOREIGN PATENT DOCUMENTS

| | | | |
|---|---|---|---|
| JP | 2013-087313 | * | 5/2013 |
| JP | 2013-87313 A | | 5/2013 |
| JP | 2016-130357 A | | 7/2016 |
| JP | 2018-193614 A | | 12/2018 |
| WO | WO 2019/116531 A1 | | 6/2019 |

* cited by examiner

ALLOYED HOT DIP GALVANNEALED STEEL SHEET

FIELD

The present invention relates to alloyed hot dip galvannealed steel sheet. More specifically, the present invention relates to high strength alloyed hot dip galvannealed steel sheet having high LME resistance and hydrogen embrittlement resistance.

BACKGROUND

In recent years, steel sheet used in automobiles, household electrical appliances, building materials, and other various fields have been made increasingly higher in strength. For example, the use of high strength steel sheet has increased in the field of automobiles for the purpose of reducing vehicle body weight to improve fuel economy. Such high strength steel sheet typically includes elements such as C, Si, Mn, and Al to improve the strength of the steel.

In the production of high strength steel sheet, heat treatment such as annealing is generally performed after rolling. Furthermore, among the elements typically included in high strength steel sheet, the easily oxidizable elements of Si, Mn, and Al may bond with the oxygen in the atmosphere during the heat treatment and sometimes form an oxide-including layer in the vicinity of the surface of the steel sheet. The forms that such a layer takes include a form in which oxides including Si, Mn, or Al form a film on the outside (surface) of the steel sheet (external oxidation layer) and a form in which the oxides are formed on the inside (surface layer) of the steel sheet (internal oxidation layer).

When forming a plating layer (for example, a Zn-based plating layer) on the surface of steel sheet having an external oxidation layer, oxides will be present as a film on the surface of the steel sheet and will therefore impede interdiffusion between the steel constituents (for example, Fe) and plating constituents (for example, Zn) thereby affecting the adhesion between the steel and the plating, sometimes resulting in insufficient plateability (for example, there will be an increase in non-plated parts). Therefore, from the viewpoint of improving plateability, steel sheet formed with an internal oxidation layer is more preferable than steel sheet formed with an external oxidation layer.

In relation to internal oxidation layers, PTLs 1 and 2 disclose a high strength plated steel sheet with a tensile strength of 980 MPa or more comprised of a plated steel sheet having a zinc-based plating layer on a base steel sheet including C, Si, Mn, Al, etc. and having an internal oxidation layer including Si and/or Mn on a surface layer of the base steel sheet.

CITATIONS LIST

Patent Literature

[PTL 1] Japanese Unexamined Patent Publication No. 2016-130357
[PTL 2] Japanese Unexamined Patent Publication No. 2018-193614

SUMMARY

Technical Problem

High strength steel sheet used for automotive members etc. are sometimes used in corrosive atmospheric environments in which the temperature and humidity fluctuate greatly. It is known that if high strength steel sheet is exposed to such a corrosive atmospheric environment, hydrogen generated in the process of corrosion will penetrate into the steel. The hydrogen penetrating the steel will segregate at the martensite grain boundaries in the steel microstructure and make the grain boundaries brittle to thereby possibly cause cracks in the steel sheet. The phenomenon of cracks being caused due to this penetrated hydrogen is called "hydrogen embrittlement cracking" (delayed cracking) and often becomes a problem during working of steel. Accordingly, to prevent hydrogen embrittlement cracking, in steel sheet used in corrosive environments, it is effective to reduce the amount of hydrogen buildup in the steel.

Furthermore, in the case of hot stamping or welding plated steel sheet comprising high strength steel sheet provided with a Zn-based plating layer etc., the plated steel sheet is worked at a high temperature (for example, about 900° C.), so can possibly be worked in a state in which the Zn included in the plating layer has melted. In this case, the molten Zn will sometimes penetrate into the steel and cause cracks inside the steel sheet. This phenomenon is called "liquid metal embrittlement (LME)". It is known that the fatigue properties of steel sheet degrade due to this LME. Accordingly, to prevent LME cracking, it is effective to keep the Zn etc. included in the plating layer from penetrating into the steel sheet.

PTLs 1 and 2 teach that by controlling the average depth of the internal oxidation layer to a thick 4 µm or more and having the internal oxidation layer function as a hydrogen trap site, it is possible to prevent penetration of hydrogen and suppress hydrogen embrittlement. However, controlling the form of the oxides present in the internal oxidation layer has not been studied at all. There is still room for improvement of hydrogen embrittlement resistance. Furthermore, improvement of LME resistance has not been studied.

In consideration of these circumstances, the object of the present invention is to provide high strength alloyed hot dip galvannealed steel sheet having high LME resistance and hydrogen embrittlement resistance.

Solution to Problem

The inventors discovered that to solve the above problem it is important to form oxides in the surface layer of the steel sheet, that is, on the inside of the steel sheet, and furthermore, to control the form of the oxides present in the surface layer of the steel sheet. In further detail, the inventors discovered that it is possible to obtain high hydrogen embrittlement resistance by forming, as the form of oxides contained in the internal oxidation layer, grain boundary oxides present inside the crystal grain boundaries of the metallographic structure in a large amount so as to make the grain boundary oxides function as escape routes for hydrogen penetrating the steel and further that high LME resistance can be achieved by forming a lamellar region with a low Si and high Al composition of the metallographic structure at a depth of ½ of the internal oxidation layer (sometimes called a "surface depleted layer").

The present invention is based on the above findings and has as its gist the following:

(1) Alloyed hot dip galvannealed steel sheet having
steel sheet having a chemical composition comprising, by mass %,
C: 0.05 to 0.40%,
Si: 0.2 to 3.0%, Mn: 0.1 to 5.0%,
sol. Al: 0.4 to 1.50%,
P: 0.0300% or less,
S: 0.0300% or less,
N: 0.0100% or less,
B: 0 to 0.010%,
Ti: 0 to 0.150%,
Nb: 0 to 0.150%,
V: 0 to 0.150%,
Cr: 0 to 2.00%,
Ni: 0 to 2.00%,
Cu: 0 to 2.00%,
Mo: 0 to 1.00%,
W: 0 to 1.00%,
Ca: 0 to 0.100%,
Mg: 0 to 0.100%,
Zr: 0 to 0.100%,
Hf: 0 to 0.100%, and
REM: 0 to 0.100% and
having a balance of Fe and impurities and
an alloyed hot dip galvannealed layer which is deposited on at least one surface of the steel sheet to 10 to 100 g/m² and which has a chemical composition comprised of, by mass %,
Fe: 5.0 to 15.0% and
Al: 0.01 to 1.0% and having a balance of Zn and impurities,
in which alloyed hot dip galvannealed steel sheet,
an internal oxidation layer including grain boundary oxides is present in a surface layer of the steel sheet, and,
when examining a cross-section of a surface layer of the steel sheet, a Ratio A of the length of the grain boundary oxides projected an interface of the steel sheet and the alloyed hot dip galvannealed layer to the length of interface is 50% or more and 100% or less, and
a surface depleted layer with a steel composition not including the grain boundary oxides which satisfies, by mass %, Si≤0.6% and Al≥0.05% is included at a depth of ½ of the average depth of the internal oxidation layer.
(2) The alloyed hot dip galvannealed steel sheet according to (1), wherein the Ratio A is 90% or more.
(3) The alloyed hot dip galvannealed steel sheet according to (1) or (2), containing oxides of grain sizes of 0.1 to 1.5 μm inside the alloyed hot dip galvannealed layer in a number density of 1 to 10/(5 μm×5 μm).

Advantageous Effects of Invention

According to the present invention, by forming the grain boundary oxides at the surface layer of the steel sheet in a large amount, the grain boundary oxides can be made to function as an escape route for hydrogen penetrating the steel. As a result, the penetrated hydrogen can be discharged, the amount of hydrogen built up in the steel can be reduced, and the hydrogen embrittlement resistance can be greatly improved. Moreover, according to the present invention, by forming a lamellar region with a low Si and high Al composition of the metallographic structure at a depth of ½ of the internal oxidation layer (sometimes referred to as a "surface depleted layer"), the Al functions as trap sites for Zn penetrating the steel during hot stamping or welding and can greatly suppress the amount of Zn penetrating the steel and further improve the LME resistance. Accordingly, through the present invention, it is possible to achieve high LME resistance and hydrogen embrittlement resistance in high strength alloyed hot dip galvannealed steel sheet.

DESCRIPTION OF EMBODIMENTS

<Steel Sheet>
The alloyed hot dip galvannealed steel sheet according to the present invention has A steel sheet having a chemical composition comprising, by mass %,
C: 0.05 to 0.40%,
Si: 0.2 to 3.0%,
Mn: 0.1 to 5.0%,
sol. Al: 0.4 to 1.50%,
P: 0.0300% or less,
S: 0.0300% or less,
N: 0.0100% or less,
B: 0 to 0.010%,
Ti: 0 to 0.150%,
Nb: 0 to 0.150%,
V: 0 to 0.150%,
Cr: 0 to 2.00%,
Ni: 0 to 2.00%,
Cu: 0 to 2.00%,
Mo: 0 to 1.00%,
W: 0 to 1.00%,
Ca: 0 to 0.100%,
Mg: 0 to 0.100%,
Zr: 0 to 0.100%,
Hf: 0 to 0.100%, and
REM: 0 to 0.100% and
having a balance of Fe and impurities and
an alloyed hot dip galvannealed layer which is deposited on at least one surface of the steel sheet to 10 to 100 g/m² and which has a chemical composition comprised of, by mass %,
Fe: 5.0 to 15.0% and
Al: 0.01 to 1.0% and having a balance of Zn and impurities,
in which alloyed hot dip galvannealed steel sheet,
an internal oxidation layer including grain boundary oxides is present in a surface layer of the steel sheet, and,
when examining a cross-section of a surface layer of the steel sheet, a Ratio A of the length of the grain boundary oxides projected an interface of the steel sheet and the alloyed hot dip galvannealed layer to the length of interface is 50% or more and 100% or less, and
a surface depleted layer with a steel composition not including the grain boundary oxides which satisfies, by mass %, Si≤0.6% and Al≥0.05% is included at a depth of ½ of the average depth of the internal oxidation layer.
The alloyed hot dip galvannealed steel sheet can be obtained by hot dip galvanizing a steel sheet, then alloying it. First, steel sheet sometimes used for alloyed hot dip galvannealed steel sheet, in particular high strength steel sheet, will be explained. In the production of steel sheet, in particular high strength steel sheet, a steel slab adjusted to a predetermined chemical composition is rolled (typically, hot rolled and cold rolled), then generally annealed for the purpose of obtaining the desired microstructure etc. In the annealing, the comparatively easily oxidizable constituents in the steel sheet (for example, Si, Mn, and Al) bond with the oxygen in the annealing atmosphere whereby a layer including oxides is formed in the vicinity of the surface of the steel sheet. For example, like the steel sheet 1 shown in FIG. 1, an external oxidation layer 2 is formed as a film on the surface of the base steel 3 (that is, the outside of the base steel 3). If an external oxidation layer 2 is formed as a film on the surface of the base steel 3, if forming a plating layer (for example, zinc-based plating layer), the external oxidation layer 2 will impede interdiffusion between the plating constituents (for example, Zn, Al) and steel constituents (for example, Fe), so sometimes sufficient adhesion between the steel and plating cannot be secured and non-plated parts where no plating layer is formed will arise.

Figure 1:
FIG. 1 is a schematic view of a cross-section of steel sheet having an external oxidation layer.
Figure 2:
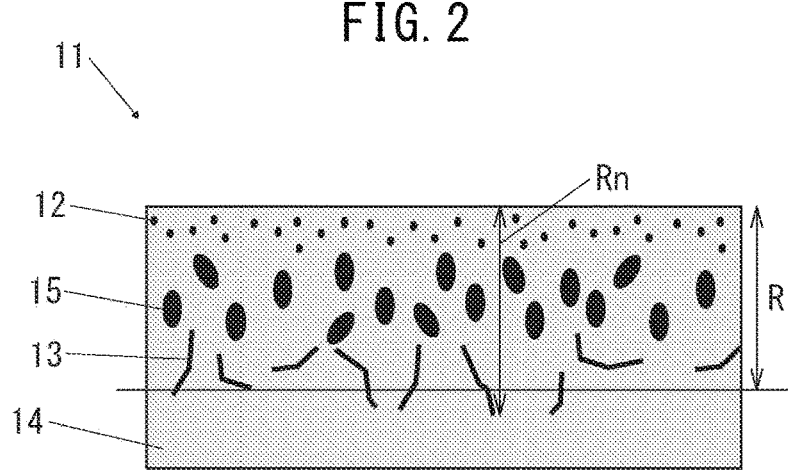
FIG. 2 is a schematic view of a cross-section of steel sheet according to the present embodiment.

In contrast, as illustrated in FIG. 2, the steel sheet 11 contained in the alloyed hot dip galvannealed steel sheet according to the present invention preferably does not have an external oxidation layer 2 formed on the surface of the base steel 3 like the steel sheet 1 shown in FIG. 1, but has fine granular oxides 12, coarse granular oxides 15, and grain boundary oxides 13 present at the inside of the base steel 14. Accordingly, when forming a plating layer on the surface of the steel sheet 11, the steel sheet 11 according to the present embodiment in which oxides 12, coarse granular oxides 15, and grain boundary oxides 13 are formed inside of the base steel 14 can achieve sufficient interdiffusion between the plating constituents and steel constituents and can obtain high plateability in comparison to steel sheet 1 having an external oxidation layer 2 like in FIG. 1. Therefore, the inventors discovered that from the viewpoint of achieving high plateability, it is effective to control the conditions during annealing to form oxides at the inside of the steel sheet. Note that the term "high plateability", when used regarding steel sheet, means that when plating the steel sheet, it is possible to form a plating layer in a state in which there are few non-plated parts (parts where the plating layer is not formed) (for example, 5.0 area % or less) or none at all. Further, the term "high plateability", when used regarding plated steel sheet, means a plated steel sheet in a state with extremely few non-plated parts (for example, 5.0 area % or less) or none at all. From the viewpoint of the above plateability, in the steel sheet 11 according to the present embodiment, the less of an external oxidation layer, the better, but there may be an external oxidation layer so long as it is within a range in which high plateability can be achieved.

Further, high strength steel sheet used in an atmospheric environment, particularly high strength steel sheet for automobiles, is used repeatedly exposed in various environments of differing temperature and humidity. Such an environment is called a "corrosive atmospheric environment". It is known that hydrogen is generated in the process of corrosion in a corrosive atmospheric environment. Moreover, the hydrogen penetrates deeper than the surface layer region in the steel and segregates at the martensite grain boundaries of the steel sheet microstructure thereby causing embrittlement of the grain boundaries and triggering hydrogen embrittlement cracking (delayed cracking) in the steel sheet. Martensite is a hard structure, so has a high hydrogen susceptibility and is more vulnerable to hydrogen embrittlement cracking. Such cracking can become a problem when working steel sheet. Accordingly, to prevent hydrogen embrittlement cracking, in high strength steel sheet used in a corrosive atmospheric environment, it is effective to reduce the amount of hydrogen built up in the steel, more specifically, the amount of hydrogen built up at positions deeper than the surface layer region of the steel sheet. The inventors discovered that by controlling the form of oxides present at the surface layer of steel sheet, more specifically, by causing "fine granular oxides" having a grain size and number density in predetermined ranges to be present as oxides, the fine granular oxides function as trap sites for hydrogen penetrating it at the surface layer region of the steel sheet in a corrosive environment and enable a further reduction in the amount of hydrogen built up in steel sheet used in a corrosive environment, that by additionally causing "coarse granular oxides" having a grain size and number density in predetermined ranges to be present as oxides, the coarse granular oxides function as trap sites for hydrogen penetrating it at the surface layer region of the steel sheet in a corrosive environment and enable a further reduction in the amount of hydrogen built up in steel sheet used in a corrosive environment, furthermore that by making "grain boundary oxides" be copresent at a predetermined ratio, the grain boundary oxides function as escape routes for penetrated hydrogen and thereby not only suppress penetration by hydrogen, but also promote discharge of penetrated hydrogen to the outside of the system and thereby enable a reduction in the amount of hydrogen built up in steel sheet used in a corrosive environment. Note that the term "high hydrogen embrittlement resistance" means a state in which the amount of hydrogen built up in steel sheet or plated steel sheet is reduced enough so that hydrogen embrittlement cracking can be sufficiently suppressed.

The inventors analyzed in detail the relationship between the form of the oxides and their effectiveness as trap sites for hydrogen. As a result, they discovered that, as shown in FIG. 2, that it was effective to have the fine granular oxides 12 dispersed as grains in the surface layer of the base steel 14 be present separated from each other in large amounts. In addition, they discovered that it was even more effective to have the coarse granular oxides 15 dispersed as grains in the surface layer of the base steel 14 be present separated from each other in large amounts. While not being bound to any specific theory, the function of the oxides in the steel sheet of trapping penetrating hydrogen is believed to have a positive correlation with the surface area of the oxides. That is, it is believed that by the fine granular oxides being dispersed separated from each other in large amounts at the surface layer of the steel sheet, the surface area of the oxides at the surface layer of the steel sheet increased and the hydrogen trap function is improved. Furthermore, if hydrogen excessively penetrates the steel and the fine granular oxides are unable to trap it, since the coarse granular oxides are relatively large in volume and the amount of hydrogen that can be trapped is also large, it is believed that the excessively penetrating hydrogen can also be trapped and the hydrogen trap function is further improved. Therefore, the inventors discovered that it is important, from the viewpoint of achieving high hydrogen embrittlement resistance, to control conditions at the time of production of steel sheet, particularly at the time of annealing, so that fine granular oxides and coarse granular oxides functioning as trap sites for hydrogen penetrating the steel in a corrosive environment are present in large amounts. They discovered that if forming a hot dip galvanized layer at the surface of the base steel and alloying it, at least part of the fine granular oxides and coarse granular oxides present at the surface layer of the base steel remains at the alloyed hot dip galvannealed layer and can function as trap sites for hydrogen. Note that, the metallographic structure of the surface layer of steel sheet is typically constituted by a metallographic structure softer than the inside of the steel sheet (for example, at a ⅛ position or ¼ position of the thickness), so even if there is hydrogen at the surface layer of the steel sheet, hydrogen embrittlement cracking will not particularly be a problem. Further, the alloyed hot dip galvannealed layer is also constituted by a metallographic structure softer than the inside of the steel sheet (for example, at a ⅛ position or ¼ position of the thickness), so even if there is hydrogen at the surface layer of the steel sheet, hydrogen embrittlement cracking will not particularly be a problem.

Furthermore, the inventors analyzed in detail the relationship between the form of the oxides and their effectiveness as escape routes for hydrogen. As a result, as shown in FIG. 2, they discovered that that it was effective to make the grain boundary oxides 13 present at the crystal grain boundaries be present in large amounts at the surface layer of the base steel 14. They discovered that by the grain boundary oxides 13 being present in large amounts, escape routes of hydrogen in the steel to the outside of the system are secured and hydrogen penetrating the steel can be efficiently discharged to the outside of the system along the crystal grain boundaries. Furthermore, they discovered that if the grain boundary oxides are present at deeper positions in the steel sheet, even more hydrogen can be discharged from inside of the steel sheet to the outside of the system and the amount of hydrogen built up in the steel sheet can be reduced more. Therefore, by establishing the copresence of the above-mentioned granular oxides and the grain boundary oxides, it becomes possible to extremely greatly improve the hydrogen embrittlement resistance. They discovered that even if forming a hot dip galvanized layer at the surface of the base steel and alloying it, at least part of the grain boundary oxides present at the surface layer of the base steel remains in the base steel below the alloyed hot dip galvannealed layer and can function as an escape route for hydrogen.

On the other hand, when hot stamping or welding a plated steel sheet that has a plating layer including Zn provided on the steel sheet surface, because of the high temperature during working, sometimes the Zn included in the plating layer will melt. If the Zn melts, the molten Zn will penetrate the steel. If working is performed in that state, sometimes liquid metal embrittlement (LME) cracking will occur inside of the steel sheet and the fatigue properties of the steel sheet will degrade due to LME. The inventors discovered that if the fine granular oxides and coarse granular oxides have the desired number densities, they can contribute not only to improving hydrogen embrittlement resistance but also improving LME resistance. In further detail, they discovered that the fine granular oxides and coarse granular oxides function as trap sites for Zn trying to penetrate the steel during working at a high temperature. Due to this, Zn trying to penetrate the steel during, for example, hot stamping, is trapped by the fine granular oxides and coarse granular oxides at the surface layer of the steel sheet and penetration of Zn into the crystal grain boundaries is suitably suppressed. Accordingly, they discovered that not only for improving the above-mentioned hydrogen penetration resistance but also improving the LME resistance, it is important for fine granular oxides and coarse granular oxides to be made present in large amounts. They discovered that if forming a hot dip galvanized layer at the surface of the base steel and alloying it, at least part of the fine granular oxides and coarse granular oxides present at the surface layer of the base steel remains at the alloyed hot dip galvannealed layer and can function as trap sites for Zn trying to penetrate the steel during high temperature working.

Furthermore, the fine granular oxides, coarse granular oxides, and grain boundary oxides are formed by oxidation of the comparatively easily oxidizable constituents in the steel sheet (for example, Si, Mn, Al), so the composition of the steel around the oxides (in other words, the metallographic structure) is depleted in these easily oxidizable constituent elements compared to the original steel sheet base material. The region where the elements of the steel composition are depleted compared to the original steel sheet base material is also called a "depleted region". A lamellar "depleted region" is also called a "depleted layer". Further, one present at the surface layer of the steel sheet is also called a "surface depleted layer". In a depleted region, among the easily oxidizable elements, Si oxidizes relatively easily, whereas Al oxidizes with relatively more difficulty, therefore Si can be made present in a small concentration and Al in a high concentration. The inventors also discovered that if a depleted region with such a low Si and high Al steel composition is present in a desired range, it also contributes to improving LME resistance. In further detail, they discovered that in addition to fine granular oxides and coarse granular oxides functioning as Zn trap sites, if Al is present in the steel composition around the granular oxides and grain boundary oxides, the Al will function as trap sites for Zn trying to penetrate the steel during working at high temperature and that because LME cracking is more likely to occur the higher the concentration of Si in the steel composition, so LME can be suppressed by keeping the Si to as low a concentration as possible. Due to this, the Zn trying to penetrate the steel during, for example, hot stamping, is trapped by the Al in the composition of the steel, the penetration of Zn to the crystal grain boundaries is suitably suppressed, and, since there is a low concentration of Si easily causing LME, LME is less likely to occur. Accordingly, they discovered that it is important that a depleted region with a low Si concentration and high Al concentration be made present in order to improve LME resistance. They discovered that even if forming a hot dip galvanized layer at the surface of the base steel and alloying it, at least part of the depleted region with a low Si and high Al composition of the steel remains at the base steel below the alloyed hot dip galvannealed layer. Due to Al being present at the depleted region in a high concentration, the Al functions as trap sites for Zn trying to penetrate the steel during high temperature working and that due to the Si being present at the depleted region in a low concentration, LME can be suppressed.

A depleted region in which Si is present in a low concentration and Al is present in a high concentration can also double as a region in which fine granular oxides, coarse granular oxides, and grain boundary oxides are distributed, that is, it can be formed inside of the base steel instead of being formed like the external oxidation layer 2 on the surface of the base steel 3 in FIG. 1. Accordingly, when forming a plating layer on the surface of the steel sheet, the alloyed hot dip galvannealed steel sheet according to the present invention in which a depleted region, in more detail, a surface depleted layer, is formed inside of the base steel, can realize sufficient interdiffusion between the plating constituents and steel constituents and achieve higher plateability in comparison to steel sheet 1 having an external oxidation layer 2 like in FIG. 1.

Below, the steel sheet according to the present embodiment will be explained in detail. Note that the thickness of the steel sheet according to the present invention is not particularly limited but may be, for example, 0.1 to 3.2 μmm.

[Chemical Composition of Steel Sheet]

The chemical composition of the steel sheet according to the present embodiment will be explained next. The "%" regarding content of the elements, unless otherwise stated, will mean "mass %". In the numerical ranges in the chemical composition, a numerical range expressed using "to", unless otherwise indicated, will mean a range having the numerical values before and after the "to" as the lower limit value and the upper limit value.

(C: 0.05 to 0.40%)

C (carbon) is an important element for securing the strength of steel. If the C content is insufficient, sufficient strength is liable to be unable to be secured. Furthermore, sometimes the desired form of the internal oxides and/or surface depleted layer will not be achieved due to the insufficient C content. Accordingly, the C content is 0.05% or more, preferably 0.07% or more, more preferably 0.10% or more, even more preferably 0.12% or more. On the other hand, if the C content is excessive, the weldability is liable to degrade. Accordingly, the C content is 0.40% or less, preferably 0.35% or less, more preferably 0.30% or less.

(Si: 0.2 to 3.0%)

Si (silicon) is an element effective for improving the strength of steel. If the Si content is insufficient, sufficient strength is liable to be unable to be secured. Furthermore, the desired oxides, particularly fine granular oxides, coarse granular oxides, and grain boundary oxides, and/or the surface depleted layer are liable to not be sufficiently formed inside of the steel sheet. Accordingly, the Si content is 0.2% or more, preferably 0.3% or more, more preferably 0.5% or more, even more preferably 1.0% or more. On the other hand, if the Si content is excessive, deterioration of the surface properties is liable to be triggered. Furthermore, coarsening of the granular oxides is liable to be invited. Accordingly, the Si content is 3.0% or less, preferably 2.5% or less, more preferably 2.0% or less.

(Mn: 0.1 to 5.0%)

Mn (manganese) is an element effective for obtaining hard structures to improve the strength of steel. If the Mn content is insufficient, sufficient strength is liable to be unable to be secured. Furthermore, the desired oxides, particularly fine granular oxides, coarse granular oxides, and grain boundary oxides, and/or the surface depleted layer are liable to not be sufficiently formed inside of the steel sheet. Accordingly, the Mn content is 0.1% or more, preferably 0.5% or more, more preferably 1.0% or more, even more preferably 1.5% or more. On the other hand, if the Mn content is excessive, the metallographic structure is liable to become uneven due to Mn segregation and the workability is liable to decline. Furthermore, coarsening of the granular oxides is liable to be invited. Accordingly, the Mn content is 5.0% or less, preferably 4.5% or less, more preferably 4.0% or less, even more preferably 3.5% or less.

(sol. Al: 0.4 to 1.50%)

Al (aluminum) is an element which acts as a deoxidizing element. If the Al content is insufficient, a sufficient deoxidizing effect is liable to be unable to be secured. Furthermore, the desired oxides, particularly fine granular oxides, coarse granular oxides, and grain boundary oxides, and/or the surface depleted layer are liable to not be sufficiently formed inside of the steel sheet. The Al content may be 0.4% or more, but to achieve the desired effects sufficiently and obtain fine granular oxides, coarse granular oxides, grain boundary oxides, and a surface depleted layer, the Al content should be 0.5% or more, preferably 0.6% or more, more preferably 0.7% or more. On the other hand, if the Al content is excessive, it is liable to trigger a reduction in the workability or a deterioration in surface properties. Furthermore, coarsening of the granular oxides is liable to be invited. Accordingly, the Al content is 1.50% or less, preferably 1.20% or less, more preferably 0.80% or less. The Al content means the content of so-called acid-soluble Al (sol. Al).

(P: 0.0300% or less)

P (phosphorus) is an impurity commonly contained in steel. If the P content is more than 0.0300%, the weldability is liable to decline. Accordingly, the P content is 0.0300% or less, preferably 0.0200% or less, more preferably 0.0100% or less, even more preferably 0.0050% or less. The lower limit of the P content is not particularly prescribed, but from the viewpoint of production costs, the P content may be more than 0% or be 0.00010% or more.

(S: 0.0300% or less)

S (sulfur) is an impurity commonly contained in steel. If the S content exceeds $0.0^{300}\%$, the weldability is liable to decline and the amount of precipitated MnS may increase and reduce workability such as bendability. Accordingly, the S content is 0.0300% or less, preferably 0.0100% or less, more preferably 0.0050% or less, even more preferably 0.0020% or less. The lower limit of the S content is not particularly prescribed, but from the viewpoint of desulfurization costs, the S content may be more than 0% or be 0.00010% or more.

(N: 0.0100% or less)

N (nitrogen) is an impurity commonly contained in steel. If the N content exceeds 0.0100%, the weldability is liable to decline. Accordingly, the N content is 0.0100% or less, preferably 0.0080% or less, more preferably 0.0050% or less, even more preferably 0.0030% or less. The lower limit of the N content is not particularly prescribed, but from the viewpoint of production costs, the N content may be more than 0% or be 0.0010% or more.

(B: 0 to 0.010%)

B (boron) is an element which contributes to increasing hardenability and improving strength and further segregates at the grain boundaries to strengthen the grain boundaries and improve toughness, so may be contained as necessary. Accordingly, the B content is 0% or more, preferably 0.001% or more, more preferably 0.002% or more, even more preferably 0.003% or more. On the other hand, from the viewpoint of securing sufficient toughness and weldability, the B content is 0.010% or less, preferably 0.008% or less, more preferably 0.006% or less.

(Ti: 0 to 0.150%)

Ti (titanium) is an element which precipitates during cooling of steel as TiC and contributes to improving strength, so may be contained as necessary. Accordingly, the Ti content is 0% or more, preferably 0.001% or more, more preferably 0.003% or more, even more preferably 0.005% or more, yet even more preferably 0.010% or more. On the other hand, if contained excessively, coarse TiN is formed and the toughness is liable to be harmed, so the Ti content is 0.150% or less, preferably 0.100% or less, more preferably 0.050% or less.

(Nb: 0 to 0.150%)

Nb (niobium) is an element which contributes to improving strength through improving hardenability, so may be contained as necessary. Accordingly, the Nb content is 0% or more, preferably 0.010% or more, more preferably 0.020% or more, even more preferably 0.030% or more. On the other hand, from the viewpoint of securing sufficient toughness and weldability, the Nb content is 0.150% or less, preferably 0.100% or less, more preferably 0.060% or less.

(V: 0 to 0.150%)

V (vanadium) is an element which contributes to improving strength through improving hardenability, so may be contained as necessary. Accordingly, the V content is 0% or more, preferably 0.010% or more, more preferably 0.020% or more, even more preferably 0.030% or more. On the other hand, from the viewpoint of securing sufficient toughness and weldability, the V content is 0.150% or less, preferably 0.100% or less, more preferably 0.060% or less.

(Cr: 0 to 2.00%)

Cr (chromium) is effective for increasing the hardenability of steel and increasing the strength of steel, so may be contained as necessary. Accordingly, the Cr content is 0% or more, preferably 0.10% or more, more preferably 0.20% or more, even more preferably 0.50% or more, yet even more preferably 0.80% or more. On the other hand, if contained excessively, Cr carbides may form in large amounts and conversely the hardenability is liable to be harmed, so the Cr content is 2.00% or less, preferably 1.80% or less, more preferably 1.50% or less.

(Ni: 0 to 2.00%)

Ni (nickel) is effective for increasing the hardenability of steel and increasing the strength of steel, so may be contained as necessary. Accordingly, the Ni content is 0% or more, preferably 0.10% or more, more preferably 0.20% or more, even more preferably 0.50% or more, yet even more preferably 0.80% or more. On the other hand, excessive addition of Ni will invite an increase in costs, so the Ni content is 2.00% or less, preferably 1.80% or less, more preferably 1.50% or less.

(Cu: 0 to 2.00%)

Cu (copper) is effective for increasing the hardenability of steel and increasing the strength of steel, so may be contained as necessary. Accordingly, the Cu content is 0% or more, preferably 0.10% or more, more preferably 0.20% or more, even more preferably 0.50% or more, yet even more preferably 0.80% or more. On the other hand, from the viewpoint of suppressing a drop in toughness, cracking of slabs after casting, and a drop in weldability, the Cu content is 2.00% or less, preferably 1.80% or less, more preferably 1.50% or less.

(Mo: 0 to 1.00%)

Mo (molybdenum) is effective for increasing the hardenability of steel and increasing the strength of steel, so may be contained as necessary. Accordingly, the Mo content is 0% or more, preferably 0.10% or more, more preferably 0.20% or more, even more preferably 0.30% or more. On the other hand, from the viewpoint of suppressing a drop in toughness and weldability, the Mo content is 1.00% or less, preferably 0.90% or less, more preferably 0.80% or less.

(W: 0 to 1.00%)

W (tungsten) is effective for increasing the hardenability of steel and increasing the strength of steel, so may be contained as necessary. Accordingly, the W content is 0% or more, preferably 0.10% or more, more preferably 0.20% or more, even more preferably 0.30% or more. On the other hand, from the viewpoint of suppressing a drop in toughness and weldability, the W content is 1.00% or less, preferably 0.90% or less, more preferably 0.80% or less.

(Ca: 0 to 0.100%)

Ca (calcium) is an element contributing to inclusion control, particularly fine dispersion of inclusions, and has the action of increasing toughness, so may be contained as necessary. Accordingly, the Ca content is 0% or more, preferably 0.001% or more, more preferably 0.005% or more, even more preferably 0.010% or more, even more preferably 0.020% or more. On the other hand, if contained excessively, degradation of the surface properties will sometimes appear, so the Ca content is 0.100% or less, preferably 0.080% or less, more preferably 0.050% or less.

(Mg: 0 to 0.100%)

Mg (magnesium) is an element contributing to inclusion control, particularly fine dispersion of inclusions, and has the action of increasing toughness, so may be contained as necessary. Accordingly, the Mg content is 0% or more, preferably 0.001% or more, more preferably 0.003% or more, even more preferably 0.010% or more. On the other hand, if contained excessively, degradation of the surface properties will sometimes appear, so the Mg content is 0.100% or less, preferably 0.090% or less, more preferably 0.080% or less.

(Zr: 0 to 0.100%)

Zr (zirconium) is an element contributing to inclusion control, particularly fine dispersion of inclusions, and has the action of increasing toughness, so may be contained as necessary. Accordingly, the Zr content is 0% or more, preferably 0.001% or more, more preferably 0.005% or more, even more preferably 0.010% or more. On the other hand, if contained excessively, degradation of the surface properties will sometimes appear, so the Zr content is 0.100% or less, preferably 0.050% or less, more preferably 0.030% or less.

(Hf: 0 to 0.100%)

Hf (hafnium) is an element contributing to inclusion control, particularly fine dispersion of inclusions, and has the action of increasing toughness, so may be contained as necessary. Accordingly, the Hf content is 0% or more, preferably 0.001% or more, more preferably 0.005% or more, even more preferably 0.010% or more. On the other hand, if contained excessively, degradation of the surface properties will sometimes appear, so the Hf content is 0.100% or less, preferably 0.050% or less, more preferably 0.030% or less.

(REM: 0 to 0.100%)

A REM (rare earth element) is an element contributing to inclusion control, particularly fine dispersion of inclusions, and has the action of increasing toughness, so may be contained as necessary. Accordingly, the REM content is 0% or more, preferably 0.001% or more, more preferably 0.005% or more, even more preferably 0.010% or more. On the other hand, if contained excessively, degradation of the surface properties will sometimes appear, so the REM content is 0.100% or less, preferably 0.050% or less, more preferably 0.030% or less. Note that REM is an acronym for rare earth metals and indicates elements belonging to the lanthanide series. A REM is normally added as mischmetal.

In the steel sheet according to the present embodiment, the balance excluding the above chemical composition is comprised of Fe and impurities. Here, "impurities" mean constituents which enter from the ore, scraps, and other raw materials and various factors in the manufacturing process when industrially producing steel sheet and are allowable in a range not having a detrimental effect on the properties of the steel sheet according to the present embodiment.

In the present embodiment, the chemical composition of the steel sheet may be analyzed using an elemental analysis technique known to persons skilled in the art. For example, it is performed by inductively coupled plasma-mass spectroscopy (ICP-MS). However, C and S may be measured by combustion-infrared absorption, and N may be measured using inert gas fusion-thermal conductivity. These analyses may be performed on samples taken from the steel sheet by a method based on JIS G0417: 1999.

[Surface Layer]

In the present embodiment, the "surface layer" of the steel sheet means a region from the surface of the steel sheet (in the case of a plated steel sheet, the interface between the steel sheet and plating layer) to a predetermined depth in the thickness direction. The "predetermined depth" is typically 50 μm or less.

As illustrated in FIG. 2, preferably the steel sheet 11 according to the present embodiment includes fine granular oxides 12, coarse granular oxides 15, and grain boundary oxides 13 in the surface layer of the steel sheet 11. Preferably, the fine granular oxides 12, coarse granular oxides 15, and grain boundary oxides 13 are present only in the surface layer of the steel sheet 11. By the fine granular oxides 12, coarse granular oxides 15, and grain boundary oxides 13 being present inside of the base steel 14 (that is, being present as internal oxides), it is possible for the steel sheet 11 to have high plateability compared to the case in which there is an external oxidation layer 2 on the surface of the base steel 3 shown in FIG. 1. It is believed that this occurs because oxides which can impede interdiffusion between the plating constituents and steel constituents when forming plating (for example, Zn-based plating) on the surface of steel sheet are formed not outside the steel sheet but inside. Accordingly, the steel sheet and plated steel sheet according to the present embodiment which include granular oxides and grain boundary oxides in the surface layer of the steel sheet, that is, inside of the steel sheet, have high plateability.

Furthermore, while not illustrated in FIG. 2, the steel sheet 11 according to the present embodiment includes, in addition to the fine granular oxides 12, coarse granular oxides 15, and grain boundary oxides 13, a surface depleted layer in the surface layer of the steel sheet 11. This surface depleted layer is a region where the elements of the surrounding steel composition become depleted compared to the original steel sheet base material along with the formation of the fine granular oxides 12, coarse granular oxides 15, and grain boundary oxides 13 and can also be double as a region in which the fine granular oxides 12, coarse granular oxides 15, and grain boundary oxides 13 are distributed. That is, the surface depleted layer is present inside of the base steel 14 like the fine granular oxides 12, coarse granular oxides 15, and grain boundary oxides 13, therefore steel sheet and plated steel sheet including the fine granular oxides 12, coarse granular oxides 15, grain boundary oxides 13, and surface depleted layer also have high plateability.

[Fine Granular Oxides and Coarse Granular Oxides]

In the present embodiment, "granular oxides" mean oxides dispersed as grains inside the crystal grains of the steel or on the crystal grain boundaries. Furthermore, "granular" means being present away from each other mutually in the steel matrix, having, for example, a 1.0 to 5.0 aspect ratio (maximum linear length (major diameter) traversing the granular oxide/maximum linear length (minor diameter) traversing the oxide perpendicular to the major diameter). "Dispersed as grains" means that the grains of oxides are not positioned according to a specific rule (for example, linearly) but are positioned randomly. Since granular oxides are in fact typically present three-dimensionally in spherical shapes or substantially spherical shapes in the surface layer of the steel sheet, the granular oxides are typically observed to have circular shapes or substantially circular shapes when a cross-section of the surface layer of the steel sheet is observed. In FIG. 2, as an example, fine granular oxides 12 and coarse granular oxides 15 appearing to be substantially circular are shown. In FIG. 2, as a typical example of the steel sheet 11, the coarse granular oxides 15 are shown to be below the fine granular oxides 12. It is believed that this is because the grain size of granular oxides tends to grow larger the further inside the steel sheet. Granular oxides have less of a tendency to coarsen at the vicinity of the steel sheet surface due to the fast diffusion rate of oxygen diffusing from the atmosphere into the steel sheet, and it is believed that granular oxides will have a greater tendency to coarsen with increasing distance away from the steel sheet surface in the steel sheet inward direction because of the slower diffusion for oxygen. However, coarse granular oxides 15 sometimes are formed in the vicinity of the surface of the base steel 14.

(Grain Size)

In the present embodiment, preferably the grain size of the granular oxides is 20 nm or more and 600 nm or less. In this range, the grain size of the "fine" granular oxides is 20 nm or more and 100 nm or less, while the grain size of the "coarse" granular oxides is 150 nm or more and 600 nm or less. The upper limit of the grain size of the fine granular oxides (100 nm) is set and the lower limit of the grain size of the coarse granular oxides (150 nm) is set from the viewpoint of the measurement precision so as to avoid the case where discrimination of fine granular oxides and coarse granular oxides becomes difficult. By controlling the grain size in this way, it is possible to obtain fine granular oxides and coarse granular oxides dispersed at the surface layer of the steel sheet, the fine granular oxides and coarse granular oxides function well as trap sites for hydrogen suppressing penetration of hydrogen in a corrosive environment, and, further, the oxides function well as trap sites for Zn able to penetrate a plated steel sheet obtained by forming a plating layer on steel sheet at the time of hot stamping or welding. On the other hand, if the grain size becomes more than 600 nm, the number of the granular oxides will sometimes fall and the desired number density is liable to be unable to be obtained. The grain size of the granular oxides has a lower limit of 20 nm or more. The finer the granular oxides, the higher the specific surface area and the more improved the response as trap sites, but the amount of hydrogen and/or Zn able to be trapped by one grain falls, hydrogen and/or Zn cannot be sufficiently trapped, and the oxides are liable to not sufficiently function as trap sites for hydrogen and/or trap sites for Zn.

(Number Density of Fine Granular Oxides)

In the present embodiment, preferably the number density of fine granular oxides is $4.0/\mu m^2$ or more. By controlling the number density to such a range, it is possible to make a large amount of fine granular oxides disperse at the surface layer of the steel sheet, the fine granular oxides function well as trap sites for hydrogen suppressing the penetration of hydrogen in a corrosive environment, and further the oxides function well as trap sites for Zn able to penetrate a plated steel sheet obtained by forming a plating layer on steel sheet at the time of hot stamping or welding. On the other hand, if the number density is less than $4.0/\mu m^2$, the number density as trap sites for hydrogen and/or trap sites for Zn is not sufficient, the fine granular oxides do not sufficiently function as trap sites for hydrogen and/or trap sites for Zn, and good hydrogen embrittlement resistance and/or LME resistance is liable to be unable to be obtained. Relatively, external oxidation is promoted and good plateability is liable to be unable to be obtained. The number density of fine granular oxides is preferably $6.0/\mu m^2$ or more, more preferably $8.0/\mu m^2$ or more, further preferably $10.0/\mu m^2$ or more.

The larger the amount of fine granular oxides, the better from the viewpoint of their functioning as trap sites for hydrogen and/or trap sites for Zn, but the granular oxides sometimes become starting points of LME cracking. If more than 100/μm², the LME resistance and fatigue properties are liable to fall, so the number density of fine granular oxides may be 100/μm² or less, 90/μm² or less, 80/μm² or less, 70/μm² or less, 60/μm² or less, 50/μm² or less, 40/μm² or less, 30/μm² or less, 25/μm² or less, or 20/μm² or less.

The grain size and number density of the fine granular oxides are measured by a scan electron microscope (SEM). The specific measurement is as follows: A cross-section of the surface layer of the steel sheet is examined by a SEM and a SEM image including the fine granular oxides is obtained. From the SEM image, as examined regions, a total of 10 regions of 1.0 μm (depth direction)×1.0 μm (width direction) are selected. The examined position of each region is made 1.0 μm in the region from the steel sheet surface to 1.5 μm for the depth direction (direction vertical to surface of steel sheet) and is made 1.0 μm at any position of the SEM image for the width direction (direction parallel to surface of steel sheet). Next, SEM images of the regions selected in the above way are extracted and digitalized to divide them into oxide parts and steel parts. From the digitalized images, the area of each granular oxide part is calculated. The diameter of the circle having an area equal to that area, that is, the circle equivalent diameter, is found as the grain size of each granular oxide (nm). Oxides with a grain size of 20 nm or more and 100 nm or less in range are defined as fine granular oxides. Further, the numbers of fine granular oxides in the digitalized images are counted. The average value of the numbers of fine granular oxides of the total of the 10 regions found in this way is defined as the number density of fine granular oxides (/μm²). Note that, if only parts of the granular oxides are observed in the examined regions, that is, if not all of the contours of the granular oxides are inside the examined regions, they are not counted in the numbers.

(Number Density of Coarse Granular Oxides)

Further, preferably the number density of coarse granular oxides is 4.0/25 μm² or more. By controlling the number density to such a range, it is possible to make a large amount of coarse granular oxides disperse at the surface layer of the steel sheet, the coarse granular oxides function well as trap sites for hydrogen suppressing the penetration of hydrogen in a corrosive environment, and further the oxides function well as trap sites for Zn able to penetrate plated steel sheet obtained by forming a plating layer on steel sheet at the time of hot stamping or welding. On the other hand, if the number density is less than 4.0/25 μm², the number density as trap sites for hydrogen and/or trap sites for Zn is not sufficient, the coarse granular oxides do not sufficiently function as trap sites for hydrogen and/or trap sites for Zn, and good hydrogen embrittlement resistance and/or LME resistance is liable to be unable to be obtained. Relatively, external oxidation is promoted and good plateability is liable to be unable to be obtained. The number density of coarse granular oxides is preferably 6.0/25 μm² or more, more preferably 8.0/25 μm² or more, further preferably 10.0/25 μm² or more. The larger the amount of coarse granular oxides, the better from the viewpoint of their functioning as trap sites for hydrogen and/or trap sites for Zn, but the coarse granular oxides sometimes become starting points of LME cracking. If more than 50/25 μm², the LME resistance and fatigue properties are liable to fall, so the number density of coarse granular oxides may be 50/25 μm² or less, 40/25 μm² or less, 30/25 μm² or less, 25/25 μm² or less, or 20/25 μm² or less.

The grain size and number density of the coarse granular oxides are measured by a scan electron microscope (SEM). The specific measurement is as follows: A cross-section of the surface layer of the steel sheet is examined by the SEM and a SEM image including the coarse granular oxides is obtained. From the SEM image, as examined regions, a total of 10 regions of 5.0 μm (depth direction)×5.0 μm (width direction) are selected. The examined position of each region is made 5.0 μm in the region from the steel sheet surface to 8.0 μm for the depth direction (direction vertical to surface of steel sheet) and is made 5.0 μm at any position of the SEM image for the width direction (direction parallel to surface of steel sheet). Next, SEM images of the regions selected in the above way are extracted and digitalized to divide them into oxide parts and steel parts. From the digitalized images, the area of each granular oxide part is calculated. The diameter of the circle having an area equal to that area, that is, the circle equivalent diameter, is found as the grain size of each granular oxide (nm). Oxides with a grain size of 150 nm or more and 600 nm or less in range are defined as coarse granular oxides. Further, the numbers of coarse granular oxides in the digitalized images are counted. The average value of the numbers of coarse granular oxides of the total of the 10 regions found in this way is defined as the number density of coarse granular oxides (/25 μm²). Note that, if only parts of the granular oxides are observed in the examined regions, that is, if not all of the contours of the granular oxides are inside the examined regions, they are not counted in the numbers.

[Grain Boundary Oxides]

Figure 3:
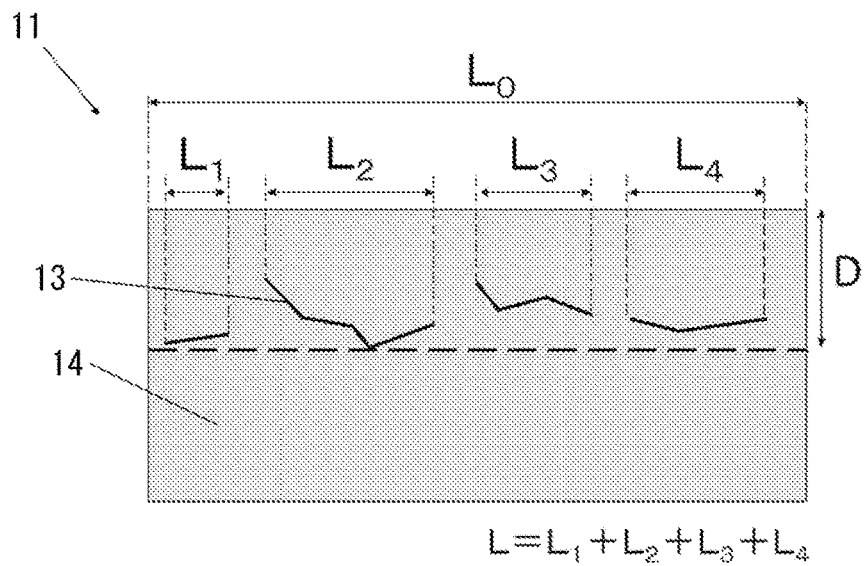
FIG. 3 is a schematic view for explaining measurement of the Ratio A in the present embodiment.

In the present embodiment, "grain boundary oxides" means oxides present along the crystal grain boundaries of the steel. Oxides present inside the crystal grains of the steel are not included. In actuality, the grain boundary oxides are present in planar shapes so as to run along the crystal grain boundaries at the surface layer of the steel sheet, so when examining a cross-section of the surface layer of a steel sheet, such grain boundary oxides are observed in line shapes. In FIG. 2 and FIG. 3, as examples, grain boundary oxides 13 appearing as line shapes are shown. Further, in FIG. 2 and FIG. 3, as a typical example of the steel sheet 11, grain boundary oxides 13 are shown below the fine granular oxides 12 and coarse granular oxides 15, but sometimes grain boundary oxides are formed near the surface of the base steel 14.

(Ratio A)

In the present embodiment, the "Ratio A", as shown in FIG. 3, means the ratio of the "length L $(=L_1+L_2+L_3+L_4)$ of grain boundary oxides projected on the surface of the steel sheet to the length $L_0$ of the surface of the steel sheet" at the examined image in the case of examining the cross-section of the surface layer of the steel sheet 11. In the present embodiment, the Ratio A is 50% or more and 100% or less. By controlling the Ratio A to such a range, it is possible to establish the presence of a large amount of grain boundary oxides 13 at the surface layer of the steel sheet. The grain boundary oxides 13 function well as escape routes for hydrogen penetrating the steel. On the other hand, if the Ratio A is less than 50%, a sufficient amount of grain boundary oxides 13 are not present as escape routes for hydrogen, the amount of hydrogen built up in the steel cannot be sufficiently reduced, and good hydrogen embrittlement resistance is liable to be unable to be obtained. Relatively speaking, external oxidation is promoted and a good plateability is liable to be unable to be obtained. The Ratio A is preferably 60% or more, more preferably 70% or more, still more preferably 80% or more, even more preferably 90% or more, and most preferably 100%.

The Ratio A, as shown in FIG. 3, is determined by examining the cross-section of the surface layer of the steel sheet 11. The specific measurement method is as follows: The cross-section of the surface layer of the steel sheet 11 is examined by a SEM. The observed position is made a randomly selected location. From the observed SEM image, the length $L_0$ of the surface (that is, the width of the SEM image) is measured. The length $L_0$ is made 100 µm or more (for example, 100 µm, 150 µm, or 200 µm) while the depth measured is made the region from the surface of the steel sheet down to 50 µm. Next, the positions of the grain boundary oxides 13 from the SEM image are identified, the identified grain boundary oxide 13 are projected on the surface of the steel sheet 11 (in the case of a plated steel sheet, on the interface of the steel sheet 11 and plating layer), and the length L of the grain boundary oxides 13 in the field ($=L_1+L_2+L_3+L_4$) is found. Based on the thus found $L_0$ and L, the Ratio A (%) in the present embodiment$=100\times L/L_0$ is found. Note that, FIG. 3 is a view eliminating the fine granular oxides 12 and coarse granular oxides 15 for explanation.

[Depth D]

In the present embodiment, the "depth D", as shown in FIG. 3, means the distance from the surface of the steel sheet 11 (in case of plated steel sheet, the interface of the steel sheet and the plating layer) to the furthest position at which the grain boundary oxides 13 are present in the case of proceeding from the surface of the steel sheet 11 in the thickness direction of the steel sheet 11 (direction vertical to surface of steel sheet). As explained above, grain boundary oxides can function as routes for escape of hydrogen penetrating the steel sheet. Therefore, if the depth D of the grain boundary oxides is large, it is possible to expel hydrogen to outside the system from a deeper position of the steel sheet, so the above function is more suitably manifested. In the steel sheet according to the present embodiment, the depth D of the grain boundary oxides is preferably 3.0 µm or more, more preferably 5.0 µm or more, still more preferably 7.0 µm or more. The upper limit of the depth D is not particularly prescribed, but the depth D is de facto 50.0 µm or less. The depth D may be found from the same image as the SEM image measured for the above Ratio A (length $L_0$ of surface).

The alloyed hot dip galvannealed steel sheet 17 according to the present embodiment is typically obtained by hot dip galvanizing the above-mentioned steel sheet 11 according to the present embodiment, then alloying it. It is shown illustratively by the schematic view of FIG. 4. As shown, at least part of the grain boundary oxides contained in the steel sheet 11 according to the present embodiment remains at the base steel 14 below the alloyed hot dip galvannealed layer 16 even after forming a hot dip galvanized layer on the surface of the steel sheet and alloying it. The grain boundary oxides 13 remaining at the base material 14 below the alloyed hot dip galvannealed layer 16 are derived from the grain boundary oxides 13 contained in the steel sheet according to the present embodiment. When examining a cross-section of the alloyed hot dip galvannealed steel sheet 17, the Ratio A of the length of the grain boundary oxides 13 projected on the interface between the base steel 14 and the alloyed hot dip galvannealed layer 16 to the length of that interface is 50% or more and 100% or less. The "Ratio A" here is obtained by a method similar to measurement of the "Ratio A" of the grain boundary oxides contained in the steel sheet 11 according to the present embodiment. By controlling the Ratio A of the grain boundary oxides 13 remaining at the base steel 14 below the alloyed hot dip galvannealed layer 16 to the above such range, it is possible to make a large amount of grain boundary oxides 13 remain at the surface layer of the base steel 14. The grain boundary oxides 13 function well as escape routes of the hydrogen penetrating the steel. On the other hand, if the Ratio A is less than 50%, a sufficient amount of grain boundary oxides 13 will not remain as escape routes of hydrogen, the amount of hydrogen built up in the steel cannot be sufficiently reduced, and excellent hydrogen embrittlement resistance is liable to be unable to be obtained. The Ratio A is preferably 60% or more, more preferably 70% or more, still more preferably 80% or more, even more preferably 90% or more, most preferably 100%.

(Depth of Internal Oxidation Layer)

In the steel sheet according to the present embodiment, the internal oxidation layer is a layer formed at the inside of the steel sheet containing fine granular oxides 12, coarse granular oxides 15, and grain boundary oxides 13. Therefore, the "internal oxidation layer" is comprised of, from the surface of the steel sheet, a succession of regions in which any of the fine granular oxides 12, coarse granular oxides 15, and grain boundary oxides 13 are present up to the furthest positions. Accordingly, the "depth of the internal oxidation layer" means, as shown in FIG. 2 by "Rn", the distance from the surface of the steel sheet 11 (in case of plated steel sheet, the interface of the steel sheet and the plating layer) to the furthest position at which any of the fine granular oxides 12, coarse granular oxides 15, and grain boundary oxides 13 is present in the case of proceeding from the surface of the steel sheet 11 in the thickness direction of the steel sheet 11 (direction vertical to surface of steel sheet). However, the actual surface of steel sheet is rough. Depending on what location (point) of the steel sheet surface is selected, the position of the fine granular oxide 12, coarse granular oxide 15, and grain boundary oxide 13 furthest from the steel sheet surface will vary, so regions for examination are selected at 10 locations and the average of the results of measurement at the 10 locations is made the "average depth of internal oxidation layer" (sometimes referred to as "R"). In FIG. 2, as an example, the case where a grain boundary oxide 13 is present at the deepest position is shown. As explained above, the fine granular oxides 12 and coarse granular oxides 15 can function as trap sites for hydrogen penetrating inside at the time of electrodeposition coating, while the grain boundary oxides 13 can function as escape routes for hydrogen penetrating the steel sheet. Therefore, the larger the average depth R of the internal oxidation layer, the greater the amount of hydrogen that is trapped at the surface layer region of the steel sheet and the greater the amount of hydrogen which can be discharged outside of the system. In the steel sheet according to the present embodiment, the lower limit of the average depth R of the internal oxidation layer is not particularly prescribed, but if too shallow, sometimes the fine granular oxides 12, coarse granular oxides 15, and the grain boundary oxides 13 cannot sufficiently be dispersed there, so the depth is preferably 8 µm or more, more preferably 10 µm or more, still more preferably 15 µm or more, and even more preferably 20 µm or more. The upper limit of the average depth R is not particularly prescribed, but is substantially 100 µm or less.

The depth R, as shown in FIG. 2 is determined by examining the cross-section of the surface layer of the steel sheet 11. The specific method of measurement is as follows: A cross-section of the surface layer of the steel sheet 11 is examined by a SEM. The positions examined are made 10 location which are randomly selected. The length $L_0$ (that is, the width of the SEM image) of the surface from the examined SEM image is measured. The length $L_0$ is made 100 µm or more (for example, 100 µm, 150 µm, or 200 µm). The depth measured is made the region down to 100 µm from the surface of the steel sheet. Next, from the SEM image, the positions of fine granular oxides 12, coarse granular oxides 15, and grain boundary oxides 13 are identified. From the identified fine granular oxides 12, coarse granular oxides 15, and grain boundary oxides 13, the fine granular oxide 12, coarse granular oxide 15, or grain boundary oxide 13 present at the position furthest from the surface of the steel sheet is selected. The distance from the surface of the steel sheet 11 to the furthest position where any of the fine granular oxide 12, coarse granular oxide 15, and grain boundary oxide 13 is positioned is found as the depth Rn. The average value of the Rn measured at 10 locations is found as the "average depth of the internal oxidation layer" (sometimes also referred to as "R").

[Chemical Composition of Oxides]

In the present embodiment, the granular oxides and grain boundary oxides (below, also referred to simply as "oxides") include one or more of the above-mentioned elements included in the steel sheet in addition to oxygen and typically have chemical compositions including Si, O, and Fe and in some cases further including Mn and Al. The oxides may also contain elements able to be included in the above-mentioned steel sheet (for example, Cr etc.) in addition to these elements.

[Surface Depleted Layer]

In the present embodiment, the fine granular oxides, coarse granular oxides, and grain boundary oxides are formed by oxidation of relatively easily oxidizable constituents in the steel sheet (for example, Si, Mn, and Al), so the composition of the steel around the oxides (in other words, the metallographic structure) is depleted in these easily oxidizable constituent elements compared with the base material of the original steel sheet. This region where the elements of the steel composition are depleted compared with the original steel sheet base material will be called a "depleted region". A lamellar shaped "depleted region" is also called a "depleted layer" while one present at the surface layer of the steel sheet will also be referred to as a "surface depleted layer". In the depleted region, among the readily oxidizable elements, Si oxidizes relatively easily and Al oxidizes with difficulty relatively speaking, so Si may be made present at a low concentration and Al at a high concentration. If there is a depleted region where the composition of the steel is low in Si and high in Al present in the desired range, this contributes to improvement of the LME resistance as well. As the reason for this, while not desiring to be bound by any specific theory, it is believed that by Al being present in the composition of the steel around the granular oxides and grain boundary oxides in addition to the granular oxides functioning as Zn trap sites, that Al functions as trap site for Zn trying to penetrate the steel during working at a high temperature and, further, that the higher the concentration of Si in the steel composition, the easier it is for LME cracking to occur, so LME can be suppressed by making Si as low a concentration as possible. Due to this, at the time of hot stamping or welding, Zn trying to penetrate the steel is trapped by the Al in the composition of the steel, penetration of Zn to the crystal grain boundaries is suitably suppressed, and, further, the Si which easily causes LME is low in concentration, so LME becomes difficult to occur and the LME resistance can be improved.

In the present embodiment, in the low Si and high Al surface depleted layer, the composition of the steel not containing fine granular oxides, coarse granular oxides, and grain boundary oxides (in other words, the metallographic structure) at a depth of ½ of the average depth of the internal oxidation layer satisfies, by mass %, Si≤0.6% and Al≥0.05%. If Si is more than 0.6%, LME cracking easily occurs. Therefore, Si≤0.6%. The lower limit of Si is not particularly prescribed, but may be 0% or more. Further, Al functions as trap sites for Zn trying to penetrate the steel during high temperature working. If Al is less than 0.05%, it is liable to be unable to function as trap sites for Zn. Therefore, Al≥0.05%. The greater the Al, the higher the function as trap sites, so the more preferable, but if the Al concentration is too high, the effect becomes saturated, so the upper limit of the Al may be made 1.2% or less or 1.0% or less.

Further, the concentrations of Si and Al are the concentrations of elements in the steel composition not including the fine granular oxides, coarse granular oxides, and grain boundary oxides of the internal oxidation layer and are the concentrations of elements measured at a depth of ½ of the average depth R of the internal oxidation layer. The base point of the average depth of the internal oxidation layer is the surface of the steel sheet (in case of plated steel sheet, the interface of the steel sheet and plating layer), but if these have roughnesses, the average line of the surfaces or interfaces at the 10 locations for finding the average depth of the internal oxidation layer is made the base point. The concentrations of elements here are measured by EDS (energy dispersed spectroscopy).

The surface depleted layer can double as a region in which the fine granular oxides, coarse granular oxides, and grain boundary oxides are dispersed and is present at the surface layer of the steel sheet. That is, it is formed at the inside of the base steel. Therefore, if forming a plating layer on the surface of the steel sheet, the steel sheet according to the present invention formed with the depleted region at the inside of the base steel, more particularly the surface depleted layer, can realize more sufficient interdiffusion of plating constituents and steel constituents and higher plateability compared with steel sheet having an external oxidation layer.

The alloyed hot dip galvannealed layer 16 according to the present embodiment is typically obtained by hot dip galvanizing the above-mentioned steel sheet 11 according to the present embodiment, then alloying it. It is shown illustratively by the schematic view of FIG. 4. While not shown, at least part of the surface depleted layer according to the present embodiment remains at the base steel 14 below the alloyed hot dip galvannealed layer 16 even after forming a hot dip galvanized layer on the surface of the base steel sheet 14 and alloying it. By Al remaining at the depleted region at a high concentration, the Al functions as trap sites for Zn trying to penetrate the steel during high temperature working or Si is present at the depleted region in a low concentration, so the LME can be suppressed. The surface depleted layer remaining at the base steel 14 below that alloyed hot dip galvannealed layer 16 is derived from the surface depleted layer contained in the steel sheet 11 according to the present embodiment. The composition of the steel not containing the oxides, in particular grain boundary oxides (in other words, the metallographic structure) at a depth of ½ of the average depth of the internal oxidation layer satisfies, by mass %, Si≤0.6% and Al≥0.05%. If Si is more than 0.6%, LME cracking easily occurs. Therefore, Si≤0.6%. The lower limit of Si is not particularly prescribed, but may be 0% or more. Further, Al functions as trap sites for Zn trying to penetrate the steel during high temperature working. If Al is less than 0.05%, it is liable to be unable to function as trap sites for Zn. Therefore, Al≥0.05%. The greater the Al, the higher the function as trap sites, so the more preferable, but if the Al concentration is too high, the effect becomes saturated, so the upper limit of the Al may be made 1.2% or less or 1.0% or less. The average depth of the internal oxidation layer and the concentration of elements here are measured by methods similar to measurement of the surface depleted layer contained in the steel sheet 11 according to the present embodiment.

<Alloyed Hot Dip Galvannealed Steel Sheet>

The alloyed hot dip galvannealed steel sheet according to the present invention has a alloyed hot dip galvannealed layer containing Zn on the above-mentioned steel sheet according to the present embodiment. This alloyed hot dip galvannealed layer may be formed on one side of the steel sheet or may be formed on both sides.

[Chemical Composition of Alloyed Hot Dip Galvannealed Layer]

The chemical composition included in a alloyed hot dip galvannealed layer in the present embodiment will be explained next. The "%" regarding content of the elements, unless otherwise stated, will mean "mass %". In the numerical ranges in the chemical composition of the plating layer, a numerical range expressed using "to", unless otherwise indicated, will mean a range having the numerical values before and after the "to" as the lower limit value and the upper limit value.

(Al: 0.01 to 1.0%)

Al is an element which is included together with Zn or is alloyed with it and improves the corrosion resistance of the plating layer. A predetermined amount of Al is contained in the composition of the steel sheet according to the present embodiment, so the alloyed hot dip galvannealed layer according to the present embodiment contains 0.01% or more of Al. In accordance with the desired corrosion resistance, the Al content may be 0.01% or more, for example, may be 0.10% or more or 0.13% or more. On the other hand, if excessively adding Al, the Zn—Fe alloying reaction will sometimes be obstructed and the alloying heat treatment will become difficult leading to increased costs, so the upper limit of the Al content is made 1.0%. Further, from the viewpoint of stable alloying, the Al content may be made 0.2% or less, preferably 0.15% or less. The Al concentration in the plating bath may be adjusted to obtain the desired properties.

(Fe: 5.0 to 15.0%)

Fe can be included in the plating layer by diffusing from the steel sheet when heat treating a plated steel sheet after forming the plating layer containing Zn on the steel sheet. Therefore, in the alloyed hot dip galvannealed layer according to the present embodiment, heat treatment is performed for alloying. The Fe content is 5.0% or more. In accordance with the extent of alloying, the Fe content may be 6.0% or more, 7.0% or more, 8.0% or more, 9.0% or more, or 10.0% or more. On the other hand, from the viewpoint of the slidability of the plated steel sheet, the Fe content is 15.0% or less and may be 12.0% or less, 10.0% or less, 8.0% or less, or 6.0% or less.

(Mg: 0 to 15.0%)

Mg is an element which is included together with Zn and Al or is alloyed with the same and improves the corrosion resistance of the hot dip galvanized layer, so may be included in accordance with need. Therefore, the Mg content may be 0%. To form a hot dip galvanized layer containing Zn, Al, and Mg, preferably the Mg content is 0.01% or more. For example, it may be 0.1% or more, 0.5% or more, 1.0% or more, or 3.0% or more. On the other hand, if more than 5.0%, the Mg will not completely dissolve in the plating bath but will float as oxides. If galvanizing by such a plating bath, oxides will deposit on the surface layer causing poor appearance or liable to cause the occurrence of non-plated parts, so the Mg content may be 15.0% or less, for example, may be 10.0% or less or 5.0% or less.

(Si: 0 to 3.0%)

Si is an element which further improves the corrosion resistance if included in a plating layer containing Zn, in particular a Zn—Al—Mg plating layer, so may be included in accordance with need. Therefore, the Si content may be 0%. From the viewpoint of improvement of the corrosion resistance, the Si content may for example be 0.005% or more, 0.01% or more, 0.05% or more, 0.1% or more, or 0.5% or more. Further, the Si content may be 3.0% or less, 2.5% or less, 2.0% or less, 1.5% or less, or 1.2% or less.

The basic chemical composition of the hot dip galvanized layer is as explained above. Furthermore the hot dip galvanized layer may contain, optionally, one or more of Sb: 0 to 0.50%, Pb: 0 to 0.50%, Cu: 0 to 1.00%, Sn: 0 to 1.00%, Ti: 0 to 1.00%, Sr: 0 to 0.50%, Cr: 0 to 1.00%, Ni: 0 to 1.00%, and Mn: 0 to 1.00%. While not particularly limited, from the viewpoint of sufficiently manifesting the actions and functions of the basic constituents forming the hot dip galvanized layer, the total content of these optional elements is preferably made 5.00% or less, more preferably 2.00% or less.

At the hot dip galvanized layer, the balance besides the above constituents is comprised of Zn and impurities. The "impurities at the hot dip galvanized layer" mean constituents such as the raw material entering due to various factors in the production process when producing the hot dip galvanized layer and not constituents intentionally added to the hot dip galvanized layer. In the hot dip galvanized layer, as impurities, elements besides the basic constituents and optional constituents explained above may be included in trace amounts in a range not impeding the effect of the present invention.

The chemical composition of the plating layer can be determined by dissolving the plating layer in an acid solution containing an inhibitor for inhibiting corrosion of the steel sheet and measuring the obtained solution by ICP (inductively coupled plasma) emission spectroscopy.

Figure 4:
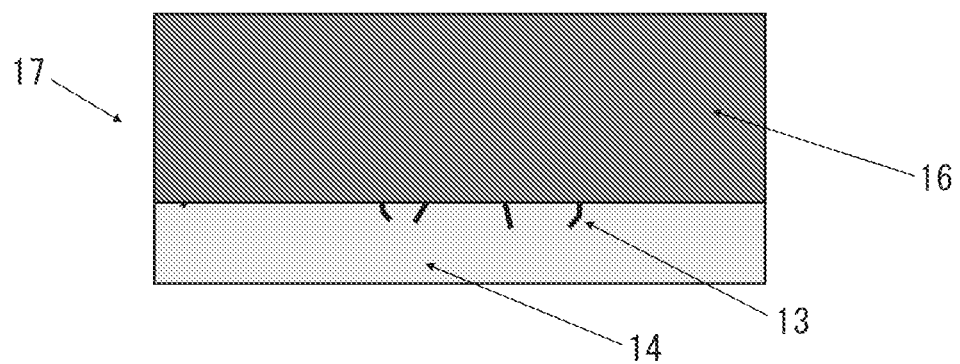
FIG. 4 is an illustrative schematic view of alloyed hot dip galvannealed steel sheet according to the present embodiment.

The alloyed hot dip galvannealed layer 16 according to the present embodiment shown illustratively in FIG. 4 is typically obtained by hot dip galvanizing the above-mentioned steel sheet 11 according to the present embodiment, then alloying it. Therefore, while not shown, in the alloyed hot dip galvannealed layer 16, at least part of the fine granular oxides 12 and coarse granular oxides 15 present at the surface layer of the steel sheet 11 remain and can function as trap sites for hydrogen. Preferably, the alloyed hot dip galvannealed layer 16 contains grain size 0.1 to 1.5 μm oxides in a number density of 1 to 10/(5 μm×5 μm). If the grain size of the oxides is less than 0.1 μm and/or if the number density is less than 1/(5 μm×5 μm), they are liable to unable to sufficiently function as trap sides for hydrogen. If the grain size of the oxides is more than 1.5 μm and/or if the number density is more than 10/(5 μm×5 μm), the homogeneity of the alloyed hot dip galvannealed layer is liable to be made to fall. The grain size and number density of the oxides are measured by techniques similar to the measurement of the fine granular oxides and the coarse granular oxides of the steel sheet according to the present embodiment.

The thickness of the plating layer may for example be 3 to 50 μm. Further, the amount of deposition of the plating layer is 10 to 100 g/m² per side. In the present invention, the amount of deposition of the plating layer is determined by dissolving the plating layer in an acid solution containing an inhibitor for inhibiting corrosion of the base iron and finding the change in weight before and after plating dissolution.

[Tensile Strength]

The hot dip galvanized steel sheet according to the present invention preferably has a high strength. Specifically, it preferably has 440 MPa or more tensile strength. For example, the tensile strength may be 500 MPa or more, 600 MPa or more, 700 MPa or more, or 800 MPa or more. The upper limit of the tensile strength is not particularly prescribed, but from the viewpoint of securing toughness, may for example be 2000 MPa or less. The tensile strength may be measured by taking a JIS No. 5 tensile test piece having a direction perpendicular to the rolling direction as its longitudinal direction and performing a test based on JIS Z 2241(2011).

The hot dip galvanized steel sheet according to the present invention is high in strength and has a high LME resistance and hydrogen embrittlement resistance, so can be suitably used in a broad range of fields such as automobiles, household electric appliances, and building materials, but is particularly preferably used in the automotive field. Hot dip galvanized steel sheet used for automobiles is often hot stamped. In that case, hydrogen embrittlement cracking and LME cracking can become remarkable problems. Therefore, when using the hot dip galvanized steel sheet according to the present invention as steel sheet for automobiles, the effect of the present invention of having a high hydrogen embrittlement resistance and LME resistance is optimally exhibited.

<Method of Production of Steel Sheet>

Below, a preferable method of production of the steel sheet according to the present invention will be explained. The following explanation is intended to illustrate the characteristic method for producing the steel sheet according to the present invention and is not intended to limit the steel sheet to one produced by the method of production explained below.

The steel sheet according to the present invention can be obtained for example by performing a casting step of casting molten steel adjusted in chemical composition to form a steel slab, a hot rolling step of hot rolling the steel slab to obtain hot rolled steel sheet, a coiling step of coiling the hot rolled steel sheet, a cold rolling step of cold rolling the coiled hot rolled steel sheet to obtain cold rolled steel sheet, a pretreatment step of brush grinding the cold rolled steel sheet, and an annealing step of annealing the pretreated cold rolled steel sheet. Alternatively, the hot rolled steel sheet may not be coiled after the hot rolling step, but pickled and then cold rolled as it is.

[Casting Step]

The conditions of the casting step are not particularly prescribed. For example, after smelting by a blast furnace or electric furnace etc., various secondary refining operations may be performed, then the molten metal cast by the usual continuous casting, ingot casting, or other method.

[Hot Rolling Step]

The thus cast steel slab can be hot rolled to obtain hot rolled steel sheet. The hot rolling step is performed by directly hot rolling the cast steel slab or by reheating after cooling once. If reheating, the heating temperature of the steel slab may for example be 1100° C. to 1250° C. In the hot rolling step, usually rough rolling and finish rolling are performed. The temperatures and rolling reductions of the rolling operations may be suitably changed in accordance with the desired metallographic structure and sheet thickness. For example, the end temperature of the finish rolling may be made 900 to 1050° C. and the rolling reduction of the finish rolling may be made 10 to 50%.

[Coiling Step]

The hot rolled steel sheet can be coiled at a predetermined temperature. The coiling temperature may be suitably changed in accordance with the desired metallographic structure etc. and may for example be 500 to 800° C. The hot rolled steel sheet may be heat treated under predetermined conditions before being coiled or after being coiled by being uncoiled. Alternatively, the sheet can be pickled after the hot rolling step without performing a coiling step and then subjected to a later explained cold rolling step.

[Cold Rolling Step]

After pickling the hot rolled steel sheet, the hot rolled steel sheet can be cold rolled to obtain cold rolled steel sheet. The rolling reduction of the cold rolling may be suitably changed in accordance with the desired metallographic structure and sheet thickness and may for example be 20 to 80%. After the cold rolling step, for example, the sheet may be air cooled to cool it down to room temperature.

[Pretreatment Step]

To obtain large amounts of fine granular oxides, coarse granular oxides, and grain boundary oxides at the surface layer of the finally obtained steel sheet and furthermore to obtain a surface depleted layer, it is effective to perform a predetermined pretreatment step before annealing the cold rolled steel sheet. This pretreatment step introduces a large amount of dislocations to the surface of the cold rolled steel sheet. Oxygen etc. diffuses faster at the grain boundaries than inside the grains, so by introducing a large amount of dislocations at the surface of the cold rolled steel sheet, it is possible to form a large number of paths like the case of grain boundaries. For this reason, at the time of annealing, the oxygen rapidly diffuses (penetrates) to the inside of the steel along these dislocations. Further, the speed of diffusion of Si and Al is also improved, so as a result the oxygen bonds with the Si and/or Al inside of the steel and thereby formation of fine granular oxides, coarse granular oxides, and grain boundary oxides can be promoted. Further, along with such promotion of formation of internal oxides, a drop in the surrounding concentrations of Si and Al is also promoted, so formation of a surface depleted layer having the desired composition can be promoted. Accordingly, if performing such a pretreatment step, in the later explained annealing step, the desired fine granular oxides, coarse granular oxides, grain boundary oxides, and surface depleted layer are easily formed. This pretreatment step includes grinding the cold rolled steel sheet surface by a heavy grinding brush (brush grinding). As the heavy grinding brush, D-100 made by Hotani may be used. At the time of grinding, the surface of the steel sheet may be coated with an NaOH 1.0 to 5.0% aqueous solution. The brush pressure may be 0.5 to 10.0 μmm, more preferably 5.0 to 10.0 μmm, and the rotational speed may be 100 to 1000 rpm. By performing brush grinding controlled to such coating solution conditions, brush pressure, and rotational speed, in the later explained annealing step, fine granular oxides, coarse granular oxides, grain boundary oxides, and a surface depleted layer can be efficiently formed at the surface layer of the steel sheet.

[Annealing Step]

The cold rolled steel sheet subjected to the above pretreatment step is annealed. The annealing is preferably performed in a state in which for example 0.1 to 30.0 MPa of tension is applied. If applying tension at the time of annealing, strain can be more effectively introduced into the steel sheet. Due to the strain, dislocations of the metallographic structure of the steel sheet are promoted and it is made easier for oxygen to penetrate the inside of the steel along those dislocations whereby oxides become easier to form inside the steel sheet. As a result, this is advantageous for increase of the number density of the granular oxides, increase of the ratio of the grain boundary oxides, and formation of the surface depleted layer.

From the viewpoint of making the granular oxides form at the desired sizes and large amounts and making the grain boundary oxides form in a large amount, the holding temperature at the annealing step may be made 750° C. to 900° C., preferably 830 to 880° C. If the holding temperature of the annealing step is less than 750° C., grain boundary oxides are liable to not be formed in a sufficiently large amount and sometimes the hydrogen embrittlement resistance will become insufficient. On the other hand, if the holding temperature of the annealing step is more than 900° C., the granular oxides are liable to become coarser and sometimes the desired granular oxides, grain boundary oxides, and/or surface depleted layer will not be obtained and sometimes the hydrogen embrittlement resistance and/or LME resistance will become insufficient. The temperature elevation rate up to the holding temperature is not particularly limited, but may be 1 to 10° C./s. Further, the temperature elevation may be performed in two stages by a first temperature elevation rate of 1 to 10° C./s and a second temperature elevation rate of 1 to 10° C./s different from the first temperature elevation rate.

The holding time at the holding temperature of the annealing step may be 50 to 300 seconds, preferably 150 to 250 seconds. If the holding time is less than 50 seconds, the granular oxides and/or grain boundary oxides are liable to not be formed in sufficiently large amounts and sometimes the LME resistance and/or hydrogen embrittlement resistance will become insufficient. On the other hand, if the holding time is more than 300 seconds, external oxidation will proceed and internal oxidation is liable to not proceed and sometimes the plateability, hydrogen embrittlement resistance, and/or LME resistance is liable to become insufficient.

From the viewpoint of causing the formation of the desired fine granular oxides, coarse granular oxides, grain boundary oxides, and surface depleted layer during the temperature elevation and holding (isothermal) in the annealing step, wetting is performed. The atmosphere of that may be made a dew point of −20 to 10° C., preferably −10 to 5° C., and 1 to 15 vol % $H_2$. If the dew point is too low, an external oxidation layer is formed on the surface of the steel sheet and an internal oxidation layer is liable to not be sufficiently formed and sometimes the plateability, hydrogen embrittlement resistance, and LME resistance will become insufficient. On the other hand, if the dew point is too high, the granular oxides are liable to become coarser and the desired granular oxides, grain boundary oxides, and/or surface depleted layer will sometimes not be obtained.

The temperature when starting wetting during the temperature elevation may be less than 600° C. If starting wetting at more than 600° C., the internal oxidation layer and/or surface depleted layer are liable to not be sufficiently formed before reaching the holding temperature.

Furthermore, it is effective to remove the internal oxidation layer of the steel sheet when performing the annealing step, in particular before the brush grinding. During the above-mentioned rolling step, in particular the hot rolling step, sometimes an internal oxidation layer is formed at the surface layer of the steel sheet. Such an internal oxidation layer formed in a rolling step is liable to inhibit the formation of fine granular oxides, coarse granular oxides, grain boundary oxides, and/or a surface depleted layer at the annealing step and to promote the formation of an external oxidation layer, so that internal oxidation layer is preferably removed before annealing by pickling etc. More specifically, the depth of the internal oxidation layer of the cold rolled steel sheet when performing an annealing step may be made 0.5 μm or less, preferably 0.3 μm or less, more preferably 0.2 μm or less, still more preferably 0.1 μm or less.

By performing the steps explained above, it is possible to obtain steel sheet comprised of steel sheet with a surface layer containing granular oxides and grain boundary oxides in sufficiently large amounts and formed with a surface depleted layer.

<Method of Production of Plated Steel Sheet>

Below, a preferable method of production of the plated steel sheet according to the present invention will be explained. The following explanation is intended to illustrate the characteristic method for producing the plated steel sheet according to the present invention and is not intended to limit the plated steel sheet to one produced by the method of production explained below.

The plated steel sheet according to the present invention can be obtained by performing a plating step for forming a plating layer containing Zn on the steel sheet produced in the above way.

[Plating Step]

The plating step may be performed according to a method known to persons skilled in the art. The plating step may for example be performed by hot dip coating and may be performed by electroplating. Preferably, the plating step is performed by hot dip coating. The conditions of the plating step may be suitably set considering the chemical composition, thickness, amount of deposition, etc. of the desired plating layer.

[Alloying Step]

After the plating, alloying is performed. The alloying step may be performed in accordance with a method known to persons skilled in the art. The alloying is performed by heating the plating to the temperature required for alloying it. Typically, it also differs according to the amount of plating deposition, but for example the alloying is performed at 480° C. or more and 580° C. or less in temperature range over 1 second or more and 50 seconds or less in time.

EXAMPLES

Below, examples will be used to explain the present invention in more detail, but the present invention is not limited to these examples in any way.

Example 1: Regarding Examples and Comparative Examples of Alloyed Hot Dip Galvannealed Steel Sheet (Preparation of Steel Sheet Samples)

Molten steels adjusted in chemical compositions were cast to form steel slabs. The steel slabs were hot rolled, pickled, then cold rolled to obtain cold rolled steel sheets. Next, the sheets were air-cooled down to room temperature. The cold rolled steel sheets were pickled, then the internal oxidation layers formed by rolling were removed down to the internal oxidation layer depth (m) before annealing described in Table 1. Next, samples were taken from the cold rolled steel sheets by the method based on JIS G0417: 1999 and the chemical compositions of the steel sheets were analyzed by ICP-MS etc. The measured chemical compositions of the steel sheets are shown in Table 1. The thicknesses of the steel sheets used were 1.6 μmm in all cases.

Next, some of the cold rolled steel sheets were coated with an NaOH 2.0% aqueous solution, pretreated by brush grinding using a heavy grinding brush (D-100 made by Hotani) at a brush pressure of 2.0 μmm and speed of 600 rpm, then were annealed by the dew point, holding temperature, and holding time shown in Table 1 to prepare the different steel sheet samples. In all of the steel sheet samples, the temperature elevation rate at the time of annealing was made 6.0° C./s up to 500° C. and 2.0° C./s from 500° C. to the holding temperature. In the annealing, some of the cold rolled steel sheets were annealed in a state with 30.0 MPa of tensions applied while the other cold rolled steel sheets were annealed without tension applied. The presence of any pretreatment and the conditions of the annealing (presence of any tension, wetting zone, dew point (° C.), hydrogen concentration (vol %), wetting start temperature (° C.) in the temperature elevation step, holding temperature (° C.), and holding time (s)) are shown in Table 1. Note that in each steel sheet sample, a JIS No. 5 tensile test piece having a direction perpendicular to the rolling direction as its longitudinal direction was taken and subjected to a tensile test based on JIS Z 2241(2011). As a result, the tensile strength was 440 MPa or more in each case.

(Preparation of Samples of Alloyed Hot Dip Galvannealed Steel Sheet)

The above samples of steel sheets were cut to 100 μmm×200 μmm sizes, then were plated to thereby prepare samples of plated steel sheets. In Table 1, the plating type is "GA (alloyed hot dip galvannealed steel sheet)". In the hot dip galvanization step, the cut samples were dipped in a 440° C. hot dip galvanization bath for 3 seconds. After dipping, they were pulled out at 100 μmm/s. $N_2$ wiping gas was used to control the amount of plating deposition to 50 g/m². After that, alloying was performed by heating at 500° C. over 1 second or more and 50 seconds or less in time, typically about 20 second, to obtain alloyed hot dip galvannealed steel sheet samples. The chemical composition of the alloyed hot dip galvannealed layer was analyzed by ICP-MS etc. whereby it was confirmed that it was a chemical composition containing Fe: 5.0 to 15.0% and Al: 0.01 to 1.0% and having a balance of Zn and impurities.

(Analysis of Surface Layer of Alloyed Hot Dip Galvannealed Steel Sheet Samples: Ratio A of Grain Boundary Oxides)

Each alloyed hot dip galvannealed steel sheet sample prepared in the above way was cut to 25 μmm×15 μmm. The cut sample was buried in a resin and polished to a mirror surface to obtain a buried sample. The Ratio A of grain boundary oxides for each steel sheet sample was measured from examination of the cross-section of the above buried sample. Specifically, in a 150 μm width (=$L_0$) SEM image, the positions of grain boundary oxides were identified, the identified grain boundary oxides were projected on the interface of the steel sheet base and plating layer, and the lengths L of the grain boundary oxides in the field were found. Based on the $L_0$ and L found in this way, the Ratio A (%)=100×L/$L_0$ was found. The ratio A (%) of granular oxides for each steel sheet sample is shown in Table 1. Further, from a similar SEM image, the depths D of the identified grain boundary oxides were measured.

(Analysis of Surface Layer of Alloyed Hot Dip Galvannealed Steel Sheet Samples: Number Density of Oxides Inside Plating Layer)

From the examination of the cross-section of the buried sample, at the cross-section of each steel sheet sample, 10 5.0 μm×5.0 μm regions were examined by a SEM. As the examined position, it is made 5.0 μm in the depth direction (direction vertical to interface of steel sheet base and plating layer) and 5.0 μm from the surface of the plating layer to that interface. For the width direction (direction parallel to surface of steel sheet), it is made 5.0 μm of any position of the SEM image. The obtained SEM images of the regions for the steel sheet samples were digitized, the areas of the oxide parts were calculated from the digitalize images, the grain size (m) of the oxides was found as the diameter of a circle having an area equal to that area, that is, the circle equivalent diameter, and the number of oxides within the 0.1 to 1.5 μm grain diameter range was counted. The average value of the numbers of oxides in the digitalized image of the 10 locations found was made the number density of the fine granular oxides. The case where the number density of oxides for each steel sheet sample is 1 to 10/5×5 μm² is indicated in Table 1 as "Yes", while other cases are indicated as "No".

(Analysis of Surface Layer of Alloyed Hot Dip Galvannealed Steel Sheet Samples: Surface Depleted Layer)

Each steel sheet sample was evaluated for a surface depleted layer by analyzing the constituents of the steel structure not containing oxides at a depth of ½ of the average depth of the internal oxidation layer calculated from the cross-sectional SEM image using TEM-EDS. Satisfying Si≤0.6% and Al≥0.05% is indicated as "Yes", while not satisfying Si≤0.6% and Al≥0.05% is indicated as "No".

(Evaluation of LME Resistance)

The LME resistance was evaluated by a hot tension test. Each steel sheet sample was cut to 130 μmm×30 μmm×1.6 μmm size to obtain a short strip shaped test piece. The test piece was heated by a temperature elevation rate of 100° C./s to 800° C., then right after that a hot tension test was performed at 800° C. by a tensile rate of 10 μmm/s until breakage to thereby measure the tensile strength. The tensile strength of a plated sample and the tensile strength of a sample with no plating layer were compared and evaluated as follows:

A: Tensile strength of plated sample/tensile strength of sample with no plating layer ≥85%
B: Tensile strength of plated sample/tensile strength of sample with no plating layer <85%

(Evaluation of Hydrogen Embrittlement Resistance)

Each 50 μmm×100 μmm plated steel sheet sample was treated to form zinc phosphate using a zinc phosphate-based conversion coating (Surfdine SD5350 series: made by Nippon Paint Industrial Coating), then was formed with an electrodeposition coating (PN110 Powernix Grey: made by Nippon Paint Industrial Coating) to 20 μm and was baked at a 150° C. baking temperature for 20 μminutes to form a coating on the plated steel sheet sample. Next, the sample was cut to 30×100 μmm to expose the iron end faces. After that, stress was applied using a bending jig so that the stress of the bent part became 800 MPa. In that state, this was used for a saltwater spray test (SST, JIS Z2371). The following criteria were used to evaluate the hydrogen embrittlement resistance. The results are shown in Table 1.

Evaluation AA: no cracking up to 180 cycles
Evaluation A: cracking at 90 to less than 180 cycles
Evaluation B: cracking at less than 90 cycles

TABLE 1

| No. | Class | Fe | C | Si | Mn | Al | P | S | N | Others | Pickling | Internal oxidation layer depth before annealing (μm) |
|---|---|---|---|---|---|---|---|---|---|---|---|---|
| 1 | Comp. ex. | Bal. | 0.03 | 1.8 | 2.0 | 0.8 | 0.0090 | 0.0013 | 0.0024 | | Yes | 0.3 |
| 2 | Ex. | Bal. | 0.05 | 0.3 | 2.0 | 0.5 | 0.0056 | 0.0146 | 0.0036 | REM: 0.002 | Yes | 0.2 |
| 3 | Ex. | Bal. | 0.10 | 0.3 | 2.0 | 1.2 | 0.0118 | 0.0012 | 0.0023 | Hf: 0.002 | Yes | 0.1 |
| 4 | Ex. | Bal. | 0.10 | 1.3 | 2.0 | 0.4 | 0.0081 | 0.0025 | 0.0031 | B: 0.001 | Yes | 0.2 |
| 5 | Ex. | Bal. | 0.10 | 1.3 | 2.2 | 1.2 | 0.0109 | 0.0024 | 0.0024 | Mg: 0.003 | Yes | 0.2 |
| 6 | Ex. | Bal. | 0.20 | 1.3 | 2.0 | 1.5 | 0.0137 | 0.0017 | 0.0024 | Zr: 0.035 | Yes | 0.1 |
| 7 | Ex. | Bal. | 0.20 | 1.8 | 2.0 | 0.7 | 0.0152 | 0.0029 | 0.0011 | | Yes | 0.2 |
| 8 | Ex. | Bal. | 0.20 | 1.8 | 2.0 | 0.8 | 0.0209 | 0.0019 | 0.0019 | | Yes | 0.1 |
| 9 | Comp. ex. | Bal. | 0.20 | 1.8 | 2.0 | 0.8 | 0.0107 | 0.0014 | 0.0013 | | Yes | 0.1 |
| 10 | Comp. ex. | Bal. | 0.20 | 1.8 | 2.0 | 0.8 | 0.0130 | 0.0013 | 0.0022 | | Yes | 0.1 |
| 11 | Comp. ex. | Bal. | 0.20 | 1.8 | 2.0 | 0.8 | 0.0130 | 0.0023 | 0.0011 | | Yes | 0.3 |
| 12 | Comp. ex. | Bal. | 0.20 | 1.8 | 2.0 | 0.8 | 0.0105 | 0.0026 | 0.0011 | | Yes | 0.1 |
| 13 | Comp. ex. | Bal. | 0.20 | 1.8 | 2.0 | 0.8 | 0.0084 | 0.0018 | 0.0017 | | Yes | 0.3 |
| 14 | Comp. ex. | Bal. | 0.20 | 1.8 | 2.0 | 0.8 | 0.0023 | 0.0015 | 0.0019 | | Yes | 0.3 |
| 15 | Comp. ex. | Bal. | 0.20 | 4.4 | 2.0 | 1.2 | 0.0076 | 0.0027 | 0.0016 | | Yes | 0.3 |
| 16 | Ex. | Bal. | 0.20 | 0 | 2.0 | 1.2 | 0.0143 | 0.0022 | 0.0022 | | Yes | 0.1 |
| 17 | Comp. ex. | Bal. | 0.20 | 1.7 | 6.0 | 1.2 | 0.0090 | 0.0011 | 0.0021 | | Yes | 0.1 |
| 18 | Comp. ex. | Bal. | 0.20 | 1.7 | 0 | 0.8 | 0.0166 | 0.0010 | 0.0023 | | Yes | 0.1 |
| 19 | Comp. ex. | Bal. | 0.20 | 1.8 | 5.0 | 1.8 | 0.0084 | 0.0022 | 0.0022 | | Yes | 0.3 |
| 20 | Comp. ex. | Bal. | 0.20 | 1.8 | 2.0 | 0.2 | 0.0090 | 0.0011 | 0.0021 | | Yes | 0.3 |
| 21 | Comp. ex. | Bal. | 0.20 | 1.8 | 2.0 | 0.7 | 0.0166 | 0.0010 | 0.0023 | | Yes | 0.1 |
| 22 | Comp. ex. | Bal. | 0.40 | 1.5 | 2.0 | 0.7 | 0.0084 | 0.0013 | 0.0020 | | Yes | 2.5 |
| 23 | Ex. | Bal. | 0.20 | 0.5 | 2.5 | 0.7 | 0.0233 | 0.0010 | 0.0022 | Cr: 1.00 | Yes | 0.2 |
| 24 | Ex. | Bal. | 0.20 | 0.7 | 2.3 | 0.8 | 0.0034 | 0.0027 | 0.0013 | Cu: 0.01 | Yes | 0.2 |
| 25 | Ex. | Bal. | 0.20 | 0.8 | 5.0 | 0.6 | 0.0110 | 0.0044 | 0.0017 | Ti: 0.030 | Yes | 0.1 |
| 26 | Ex. | Bal. | 0.20 | 0.9 | 2.0 | 0.7 | 0.0089 | 0.0021 | 0.0012 | Ni: 0.90 | Yes | 0.1 |
| 27 | Ex. | Bal. | 0.25 | 1.0 | 2.0 | 0.9 | 0.0099 | 0.0024 | 0.0012 | | Yes | 0.1 |
| 28 | Ex. | Bal. | 0.25 | 0.7 | 2.0 | 0.7 | 0.0100 | 0.0021 | 0.0015 | Nb: 0.017 | Yes | 0.1 |
| 29 | Ex. | Bal. | 0.30 | 0.7 | 2.0 | 0.7 | 0.0131 | 0.0021 | 0.0021 | V: 0.046 | Yes | 0.1 |
| 30 | Ex. | Bal. | 0.30 | 0.8 | 0.3 | 1.3 | 0.0111 | 0.0021 | 0.0024 | | Yes | 0.1 |
| 31 | Ex. | Bal. | 0.35 | 1.2 | 3.0 | 0.4 | 0.0109 | 0.0021 | 0.0022 | Mo: 0.41 | Yes | 0.2 |
| 32 | Ex. | Bal. | 0.35 | 1.5 | 2.0 | 1.0 | 0.0099 | 0.0015 | 0.0021 | W: 0.01 | Yes | 0.1 |
| 33 | Ex. | Bal. | 0.40 | 1.8 | 2.0 | 0.5 | 0.0076 | 0.0014 | 0.0015 | | Yes | 0.4 |
| 34 | Ex. | Bal. | 0.40 | 1.8 | 2.0 | 1.2 | 0.0113 | 0.0018 | 0.0011 | | Yes | 0.1 |
| 35 | Ex. | Bal. | 0.40 | 2.0 | 2.0 | 0.4 | 0.0142 | 0.0016 | 0.0017 | | Yes | 0.1 |
| 36 | Ex. | Bal. | 0.40 | 1.3 | 2.0 | 0.7 | 0.0082 | 0.0014 | 0.0017 | Ca: 0.001 | Yes | 0.1 |
| 37 | Comp. ex. | Bal. | 0.40 | 1.6 | 2.0 | 0.8 | 0.0111 | 0.0021 | 0.0016 | | Yes | 0.1 |
| 38 | Comp. ex. | Bal. | 0.20 | 1.0 | 2.3 | 0.8 | 0.0114 | 0.0023 | 0.0023 | | Yes | 0.2 |
| 39 | Comp. ex. | Bal. | 0.20 | 1.0 | 2.3 | 0.8 | 0.0114 | 0.0023 | 0.0023 | | Yes | 0.2 |

TABLE 1-continued

| No. | Brush grinding | Tension | Wetting zone | Annealing conditions Dew point (° C.) Temp. elev. | Dew point Hold-ing | Hydrogen conc. (vol %) | Wetting start temp. (° C.) | Holding temp. (° C.) | Holding time (s) | Form of internal oxidation layer Grain boundary oxides Ratio A (%) | Plating layer internal oxides | Tensile strength before plating [MPa] | Tensile strength after plating [MPa] | Depleted layer Si ≤ 0.6% and Al ≥ 0.05% | Performance Hydrogen embrittle. resist. | LME resist. |
|---|---|---|---|---|---|---|---|---|---|---|---|---|---|---|---|---|
| 1 | Yes | Yes | Temp. elev. + isothermal | 0 | 0 | 4 | 500 | 840 | 120 | 0 | No | 420 | 410 | No | B | B |
| 2 | Yes | Yes | Temp. elev. + isothermal | 0 | 0 | 4 | 500 | 850 | 200 | 90 | Yes | 550 | 540 | Yes | AA | A |
| 3 | Yes | Yes | Temp. elev. + isothermal | 0 | 0 | 4 | 400 | 860 | 250 | 90 | Yes | 560 | 550 | Yes | AA | A |
| 4 | Yes | Yes | Temp. elev. + isothermal | 0 | 0 | 4 | 300 | 860 | 100 | 90 | Yes | 570 | 460 | Yes | AA | A |
| 5 | Yes | Yes | Temp. elev. + isothermal | 0 | 0 | 4 | 250 | 860 | 120 | 90 | Yes | 800 | 790 | Yes | AA | A |
| 6 | Yes | Yes | Temp. elev. + isothermal | 0 | 0 | 4 | 360 | 880 | 100 | 100 | Yes | 590 | 680 | Yes | AA | A |
| 7 | Yes | Yes | Temp. elev. + isothermal | 0 | 0 | 4 | 450 | 880 | 200 | 100 | Yes | 770 | 750 | Yes | AA | A |
| 8 | Yes | Yes | Temp. elev. + isothermal | 0 | 0 | 4 | 550 | 900 | 120 | 100 | Yes | 850 | 830 | Yes | AA | A |
| 9 | Yes | Yes | Temp. elev. + isothermal | −40 | −40 | 4 | 500 | 840 | 120 | 0 | No | 820 | 790 | No | B | B |
| 10 | Yes | Yes | Temp. elev. + isothermal | 20 | 20 | 4 | 550 | 840 | 120 | 30 | Yes | 820 | 810 | Yes | B | A |
| 11 | Yes | No | Temp. elev. + isothermal | 0 | 0 | 4 | 550 | 980 | 120 | 21 | No | 820 | 800 | Yes | B | A |
| 12 | Yes | No | Temp. elev. + isothermal | 0 | 0 | 4 | 350 | 700 | 120 | 14 | No | 820 | 790 | Yes | B | A |
| 13 | Yes | Yes | Temp. elev. + isothermal | 0 | 0 | 4 | 350 | 840 | 35 | 33 | No | 820 | 800 | Yes | B | A |
| 14 | Yes | Yes | Temp. elev. + isothermal | 0 | 0 | 4 | 350 | 840 | 350 | 25 | No | 820 | 800 | Yes | B | A |
| 15 | Yes | Yes | Temp. elev. + isothermal | 0 | 0 | 4 | 350 | 840 | 120 | 14 | No | 850 | 840 | Yes | B | A |
| 16 | Yes | No | Temp. elev. + isothermal | 0 | 0 | 4 | 400 | 840 | 120 | 0 | No | 440 | 440 | No | B | B |
| 17 | Yes | Yes | Temp. elev. + isothermal | 0 | 0 | 4 | 400 | 840 | 120 | 39 | No | 790 | 770 | Yes | B | B |
| 18 | Yes | Yes | Temp. elev. + isothermal | 0 | 0 | 4 | 400 | 840 | 120 | 0 | No | 520 | 520 | Yes | B | B |
| 19 | Yes | Yes | Temp. elev. + isothermal | 0 | 0 | 4 | 400 | 840 | 120 | 22 | No | 880 | 870 | Yes | B | A |
| 20 | Yes | Yes | Temp. elev. + isothermal | 0 | 0 | 4 | 360 | 840 | 120 | 18 | No | 760 | 750 | No | B | B |
| 21 | Yes | Yes | Temp. elev. + isothermal | 0 | −40 | 4 | 380 | 840 | 120 | 3 | No | 790 | 760 | Yes | B | A |
| 22 | Yes | Yes | Temp. elev. + isothermal | 0 | 0 | 4 | 380 | 840 | 120 | 39 | No | 910 | 890 | Yes | B | A |

TABLE 1-continued

| | | | | | | | | | | | | |
|---|---|---|---|---|---|---|---|---|---|---|---|---|
| 23 | Yes | Yes | Temp. elev. + isothermal | 0 | 0 | 4 | 420 | 750 | 200 | 50 | No | 1200 | 1190 | Yes | A | A |
| 24 | Yes | Yes | Temp. elev. + isothermal | 0 | 0 | 4 | 420 | 760 | 50 | 50 | No | 1140 | 1130 | Yes | A | A |
| 25 | Yes | Yes | Temp. elev. + isothermal | 0 | 0 | 4 | 420 | 760 | 80 | 50 | No | 1130 | 1120 | Yes | A | A |
| 26 | Yes | Yes | Temp. elev. + isothermal | 0 | 0 | 4 | 530 | 780 | 250 | 55 | No | 850 | 840 | Yes | A | A |
| 27 | Yes | Yes | Temp. elev. + isothermal | 0 | 0 | 4 | 530 | 780 | 300 | 55 | No | 960 | 940 | Yes | A | A |
| 28 | Yes | Yes | Temp. elev. + isothermal | 0 | 0 | 4 | 530 | 780 | 120 | 60 | No | 880 | 870 | Yes | A | A |
| 29 | Yes | Yes | Temp. elev. + isothermal | 0 | 0 | 4 | 520 | 800 | 180 | 70 | No | 1150 | 1140 | Yes | A | A |
| 30 | Yes | Yes | Temp. elev. + isothermal | 0 | 0 | 4 | 520 | 800 | 250 | 70 | No | 690 | 680 | Yes | A | A |
| 31 | Yes | Yes | Temp. elev. + isothermal | 0 | 0 | 4 | 580 | 800 | 300 | 70 | No | 790 | 780 | Yes | A | A |
| 32 | Yes | Yes | Temp. elev. + isothermal | 0 | 0 | 4 | 580 | 830 | 100 | 80 | No | 700 | 690 | Yes | A | A |
| 33 | Yes | Yes | Temp. elev. + isothermal | 0 | 0 | 4 | 580 | 840 | 220 | 80 | No | 950 | 940 | Yes | A | A |
| 34 | Yes | Yes | Temp. elev. + isothermal | 0 | 0 | 4 | 300 | 840 | 250 | 80 | No | 960 | 950 | Yes | A | A |
| 35 | Yes | Yes | Temp. elev. + isothermal | 0 | 0 | 4 | 300 | 840 | 150 | 85 | No | 960 | 950 | Yes | A | A |
| 36 | Yes | Yes | Temp. elev. + isothermal | 0 | 0 | 4 | 260 | 840 | 130 | 85 | No | 880 | 860 | Yes | A | A |
| 37 | Yes | No | Temp. elev. + isothermal | 0 | 0 | 4 | 260 | 840 | <u>100</u> | 16 | No | 960 | 950 | Yes | B | A |
| 38 | No | Yes | Temp. elev. + isothermal | 0 | 0 | 4 | 540 | 840 | 80 | <u>8</u> | No | 750 | 730 | Yes | B | A |
| 39 | Yes | Yes | Temp. elev. + isothermal | 0 | 0 | 4 | <u>680</u> | 840 | 100 | <u>0</u> | No | 760 | 740 | No | B | B |

In the present example, a case where the tensile strength was 440 MPa or more, the hydrogen embrittlement resistance was evaluated as AA or A, and the LME resistance was evaluated as A was evaluated as a high strength plated steel sheet having a high hydrogen embrittlement resistance and LME resistance. In Sample Nos. 2 to 8 and 23 to 36, the chemical compositions, Ratios A of the grain boundary oxides, and surface depleted layers of the steel sheets satisfied the ranges of the present invention, so these had high LME resistance and hydrogen embrittlement resistance. In Sample No. 1, the amount of C insufficient and a sufficient strength was not obtained. Not only that, the desired grain boundary oxides and surface depleted layer were not obtained, so a high hydrogen embrittlement resistance and LME resistance were not obtained. In Sample No. 9, the dew point at the time of annealing was low, an internal oxidation layer was not sufficiently formed, an external oxidation layer was formed, and a high hydrogen embrittlement resistance and LME resistance were not obtained. In Sample No. 10, the dew point at the time of annealing was high, the granular oxides became coarser, an external oxidation layer was formed, the desired grain boundary oxides were not obtained, and a high hydrogen embrittlement resistance was not obtained. In Sample No. 11, the holding temperature at the time of annealing was high, the granular oxides became coarser, the desired grain boundary oxides were not obtained, and a high hydrogen embrittlement resistance was not obtained. In Sample No. 12, the holding temperature at the time of annealing was low, the granular oxide layer was not sufficiently formed, and high hydrogen embrittlement resistance was not obtained. In Sample No. 13, the holding time at the time of annealing was short, the granular oxide layer was not sufficiently formed, and a high hydrogen embrittlement resistance was not obtained. In Sample No. 14, the holding time at the time of annealing was long, an internal oxidation layer was not sufficiently formed, an external oxidation layer was formed, and a high hydrogen embrittlement resistance was not obtained. In Sample Nos. 15 and 17, respectively the amount of Si and amount of Mn were excessive and, in each, the internal oxidation layer was not sufficiently formed, an external oxidation layer was formed, and a high hydrogen embrittlement resistance was not obtained. In Sample Nos. 16 and 18, respectively the amount of Si and amount of Mn were insufficient and, in each, an internal oxidation layer was not sufficiently formed and a high, hydrogen embrittlement resistance and LME resistance were not obtained. In Sample No. 19, the amount of Al was excessive, an internal oxidation layer was not sufficiently formed, an external oxidation layer was formed, and a high hydrogen embrittlement resistance was not obtained. In Sample No. 20, the amount of Al was insufficient, a surface depleted layer and internal oxidation layer were not sufficiently formed, and a high hydrogen embrittlement resistance and LME resistance were not obtained. In Sample No. 21, wetting was performed only at the time of temperature elevation during annealing, the wetting time became short, the grain boundary oxide layer was not sufficiently formed, and high hydrogen embrittlement resistance was not obtained. In Sample No. 22, the internal oxidation layer depth before annealing was large, an internal oxidation layer was not sufficiently formed after annealing, an external oxidation layer was formed, and a high hydrogen embrittlement resistance was not obtained. In Sample No. 37, tension was not applied to the steel sheet at the time of annealing, so an internal oxidation layer was not sufficiently formed, and a high hydrogen embrittlement resistance was not obtained. In Sample No. 38, brush grinding was not performed before annealing, so an internal oxidation layer was not sufficiently formed, and a high hydrogen embrittlement resistance was not obtained. In Sample No. 39, the wetting start temperature was 600° C. or more, so an internal oxidation layer was not sufficiently formed and a high hydrogen embrittlement resistance and LME resistance were not obtained.

In the invention examples, grain boundary oxide layers were confirmed in the predetermined ratios in the base steel below the plating layers and predetermined surface depleted layers were confirmed to be obtained by EDS. For this reason, high hydrogen embrittlement resistance and LME resistance were obtained. On the other hand, in the comparative examples, internal oxidation layers including grain boundary oxides and/or surface depleted layers were not suitably formed in the vicinities of the surfaces of the base steel. For this reason, they were confirmed to feature at least one of penetration of a large amount of hydrogen or inferior LME resistance.

INDUSTRIAL APPLICABILITY

According to the present invention, high strength hot dip galvanized steel sheet having a high LME resistance and hydrogen embrittlement resistance can be provided. The hot dip galvanized steel sheet can be suitably used for automobiles, home electric appliances, building materials, and other applications, in particular for automobiles. As plated steel sheet for automobile use, higher collision safety and longer life can be expected. Therefore, the present invention can be said to be extremely high in value in industry.

REFERENCE NOTATIONS 1. steel sheet
2. external oxidation layer
3. base steel
11. steel sheet
12. fine granular oxides
13. grain boundary oxides
14. base steel
15. coarse granular oxides
16. alloyed hot dip galvannealed layer
17. alloyed hot dip galvannealed steel sheet

The invention claimed is:
1. Alloyed hot dip galvannealed steel sheet having steel sheet having a chemical composition comprising, by mass %,
C: 0.05 to 0.40%,
Si: 0.2 to 3.0%,
Mn: 0.1 to 5.0%,
sol. Al: 0.4 to 1.50%,
P: 0.0300% or less,
S: 0.0300% or less,
N: 0.0100% or less,
B: 0 to 0.010%,
Ti: 0 to 0.150%,
Nb: 0 to 0.150%,
V: 0 to 0.150%,
Cr: 0 to 2.00%,
Ni: 0 to 2.00%,
Cu: 0 to 2.00%,
Mo: 0 to 1.00%,
W: 0 to 1.00%,
Ca: 0 to 0.100%,
Mg: 0 to 0.100%,
Zr: 0 to 0.100%,

Hf: 0 to 0.100%, and

REM: 0 to 0.100% and having a balance of Fe and impurities and an alloyed hot dip galvannealed layer which is deposited on at least one surface of the steel sheet to 10 to 100 g/m² and which has a chemical composition comprised of, by mass %, Fe: 5.0 to 15.0% and Al: 0.01 to 1.0% and having a balance of Zn and impurities, in which alloyed hot dip galvannealed steel sheet, an internal oxidation layer including grain boundary oxides is present in a surface layer of the steel sheet, and, when examining a cross-section of a surface layer of the steel sheet, a Ratio A of the length of the grain boundary oxides projected an interface of the steel sheet and the alloyed hot dip galvannealed layer to the length of interface is 50% or more and 100% or less, and a surface depleted layer with a steel composition not including the grain boundary oxides which satisfies, by mass %, Si≤0.6% and Al≥0.05% is included at a depth of ½ of the average depth of the internal oxidation layer.

2. The alloyed hot dip galvannealed steel sheet according to claim 1, wherein the Ratio A is 90% or more.

3. The alloyed hot dip galvannealed steel sheet according to claim 1, containing oxides of grain sizes of 0.1 to 1.5 μm inside the alloyed hot dip galvannealed layer in a number density of 1 to 10/(5 μm×5 μm).

4. The alloyed hot dip galvannealed steel sheet according to claim 2, containing oxides of grain sizes of 0.1 to 1.5 μm inside the alloyed hot dip galvannealed layer in a number density of 1 to 10/(5 μm×5 μm).

* * * * *